(12) United States Patent
Azarenko

(10) Patent No.: US 12,177,369 B1
(45) Date of Patent: Dec. 24, 2024

(54) MULTIMEDIA CONTAINER FOR PHYSICAL OBJECT AUTHENTICATION AND VERIFICATION OF ATTENDANCE

(71) Applicant: Know Your Collectibles Inc., Yonkers, NY (US)

(72) Inventor: Danny Azarenko, Miami, FL (US)

( * ) Notice: Subject to any disclaimer, the term of this patent is extended or adjusted under 35 U.S.C. 154(b) by 0 days.

(21) Appl. No.: 18/651,306

(22) Filed: Apr. 30, 2024

(51) Int. Cl.
- *G06Q 30/018* (2023.01)
- *G06F 21/10* (2013.01)
- *G06Q 30/0601* (2023.01)
- *H04L 9/32* (2006.01)

(52) U.S. Cl.
CPC ........ *H04L 9/3268* (2013.01); *G06F 21/1084* (2023.08); *G06Q 30/0185* (2013.01); *G06Q 30/0643* (2013.01); *G06Q 2220/00* (2013.01); *H04L 2209/603* (2013.01); *H04L 2209/608* (2013.01)

(58) Field of Classification Search
None
See application file for complete search history.

(56) References Cited

U.S. PATENT DOCUMENTS

| | | | |
|---|---|---|---|
| 5,874,718 | A | 2/1999 | Matsui |
| 11,182,467 | B1 | 11/2021 | Medina |
| 11,334,875 | B2 | 5/2022 | Yantis et al. |
| 11,341,547 | B1 | 5/2022 | Lau et al. |
| 11,532,002 | B1 | 12/2022 | Atreya et al. |
| 11,605,062 | B2 | 3/2023 | Prakash et al. |
| 2008/0111816 | A1* | 5/2008 | Abraham ............... G06Q 30/06 345/420 |
| 2016/0283923 | A1* | 9/2016 | Hertel ..................... G07F 9/001 |
| 2020/0005284 | A1 | 1/2020 | Vijayan |
| 2022/0069996 | A1 | 3/2022 | Xue et al. |
| 2022/0222668 | A1* | 7/2022 | Blackburn ............. G06Q 40/08 |
| 2022/0239495 | A1* | 7/2022 | Norton .................. H04L 9/0825 |
| 2022/0270080 | A1 | 8/2022 | Yantis et al. |
| 2022/0309491 | A1 | 9/2022 | Shapiro et al. |
| 2022/0337392 | A1 | 10/2022 | Schauer |
| 2022/0351186 | A1 | 11/2022 | Quigley et al. |

(Continued)

FOREIGN PATENT DOCUMENTS

WO      2023064380      4/2023

OTHER PUBLICATIONS

M. S. Almadani and F. K. Hussain, "Implementing a Secure Blockchain-Based Wallet System with Multi-Factor Authentication," 2023 IEEE International Conference on e-Business Engineering (ICEBE), Sydney, Australia, 2023, pp. 23-30, doi: 10.1109/ICEBE59045.2023.00010. (Year: 2023).*

(Continued)

*Primary Examiner* — Laura Yesildag
(74) *Attorney, Agent, or Firm* — Scheef & Stone, L.L.P.; Keith C. Rawlins, Esq.

(57) ABSTRACT

A method, server, system, and computer program product creates a three-dimensional (3D) virtual certificate of authenticity (COA) that is a multimedia container having a media file that provides for an experiential presentation in the 3D COA itself. The multimedia container with media file lends credibility to the authenticity of the 3D COA. The ownership of the 3D COA can be stored in a blockchain as a non-fungible token, and easily transferred from one claimant of the 3D COA to another.

17 Claims, 7 Drawing Sheets

(56) References Cited

U.S. PATENT DOCUMENTS

| | | | |
|---|---|---|---|
| 2022/0351194 | A1 | 11/2022 | Quigley et al. |
| 2022/0366061 | A1 | 11/2022 | Spivack et al. |
| 2022/0391895 | A1 | 12/2022 | Weber et al. |
| 2023/0009908 | A1 | 1/2023 | Castinado et al. |
| 2023/0043095 | A1 | 2/2023 | Milam et al. |
| 2023/0045546 | A1 | 2/2023 | Kim et al. |
| 2023/0062776 | A1 | 3/2023 | Vosseller et al. |
| 2023/0070389 | A1 | 3/2023 | Madhusudhan et al. |
| 2023/0085677 | A1 | 3/2023 | Copeland et al. |
| 2023/0092012 | A1 | 3/2023 | Matthews et al. |
| 2023/0098615 | A1 | 3/2023 | Advani et al. |
| 2023/0118312 | A1 | 4/2023 | Sun |
| 2023/0139878 | A1 | 5/2023 | Clark et al. |
| 2023/0145439 | A1 | 5/2023 | Suk |
| 2023/0162179 | A1 | 5/2023 | Deng |
| 2023/0162180 | A1 | 5/2023 | Deng |
| 2023/0222187 | A1 | 7/2023 | Goldston et al. |
| 2023/0274287 | A1 | 8/2023 | Blaikie, III et al. |
| 2023/0351347 | A1* | 11/2023 | Damrow ................ G06Q 20/36 |
| 2023/0351680 | A1* | 11/2023 | Helfgott ................... H04L 9/50 |

OTHER PUBLICATIONS

Bhujel S, Rahulamathavan Y. A Survey: Security, Transparency, and Scalability Issues of NFT's and Its Marketplaces. Sensors (Basel). Nov. 15, 2022;22(22):8833. doi: 10.3390/s22228833. PMID: 36433429; PMCID: PMC9696178. (Year: 2022).*

Y. Gao, M. Saad, A. Oest, J. Zhang, B. Han and S. Chen, "Can I Own Your NFTs? Understanding the New Attack Surface to NFTs," in IEEE Communications Magazine, vol. 61, No. 9, pp. 64-70, Sep. 2023, doi: 10.1109/MCOM.001.2200628. (Year: 2023).*

* cited by examiner

<u>300</u>

MULTIMEDIA CONTAINER FOR PHYSICAL OBJECT AUTHENTICATION AND VERIFICATION OF ATTENDANCE

FIELD OF THE DISCLOSURE

The present disclosure generally relates to the field of establishing and curating the authenticity of physical objects. More particularly, the disclosure provides a computer-implemented method of promoting and validating a physical object by providing real-time online authentication of a blockchain-secured non-fungible token (NFT) that represents the physical object. The present disclosure also relates to the field of attendance verification, or proof of attendance.

BACKGROUND

Electronic commerce transactions related to non-fungible token assets are becoming increasingly popular. The term "fungible" refers to something that can be readily replaced by something similar. For example, for most purposes any one dollar bill is functionally equivalent to another, even though each has a unique serial number.

However, some objects are recognized expressly because they are unique or members of a limited edition of items, i.e., buyer or collector interest in such objects (and thus their market value) may be based on such characteristics. The DaVinci "Mona Lisa" painting, for example, is entirely unique and highly prized. Likewise, the "ruby slippers" featured in a famous 1939 movie are members of a very limited edition of a number of such objects used during the production of the film.

Physical objects may be represented by tokens that may be more easily managed than the objects themselves. An NFT is thus a type of token that cannot merely be replaced by another similar token, i.e., it is instead unique and not directly interchangeable, typically like a non-fungible physical object it represents. An NFT can be a digital asset that represents specific a real-world physical item or object that may, for example, be of particular value because of its rarity and popularity.

NFTs have thus become a new class of assets that people may want to collect, share or "show off," and trade. NFTs also allow content creators a unique opportunity to monetize their creativity by selling content directly to the consumer, often via the internet, without necessarily relying on galleries or auction houses. NFTs also allow content creators to prove their works are original and not copies or counterfeits.

Widespread market acceptance of NFTs may be hindered by doubts about whether an NFT really represents a physical object. A clear and provable association between a specific physical object and a specific NFT representing that object may help convince a buyer that the representation is genuine. Thus, an improved method for authenticating a physical object represented by an NFT would be advantageous.

SUMMARY

Disclosed is a method including: receiving, by a server, a request to generate a three-dimensional digital certificate of authenticity (3D COA) for a physical object; receiving, by the server from a computer device, one or more digital files containing information corresponding to the physical object; and creating, by the server, the 3D COA, wherein the 3D COA includes a multimedia container including an experiential presentation with one or more digital media files associated with the physical object.

Disclosed is a server having one or more processors, memory, and instructions stored on the memory that cause the one or more processors to: receive a request to generate a three-dimensional digital certificate of authenticity (3D COA) for a physical object; receive from a computer device, one or more digital files containing information corresponding to the physical object; and create the 3D COA, wherein the 3D COA includes a multimedia container including an experiential presentation with one or more digital media files associated with the physical object.

Disclosed is a computer program product including a non-transitory computer-readable medium with computer executable instructions tangibly embodied thereon that, when executed by a processor: receives a request to generate a three-dimensional digital certificate of authenticity (3D COA) for a physical object; receives one or more digital files containing information corresponding to the physical object; and creates the 3D COA, wherein the 3D COA includes a multimedia container including an experiential presentation with one or more digital media files associated with the physical object.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
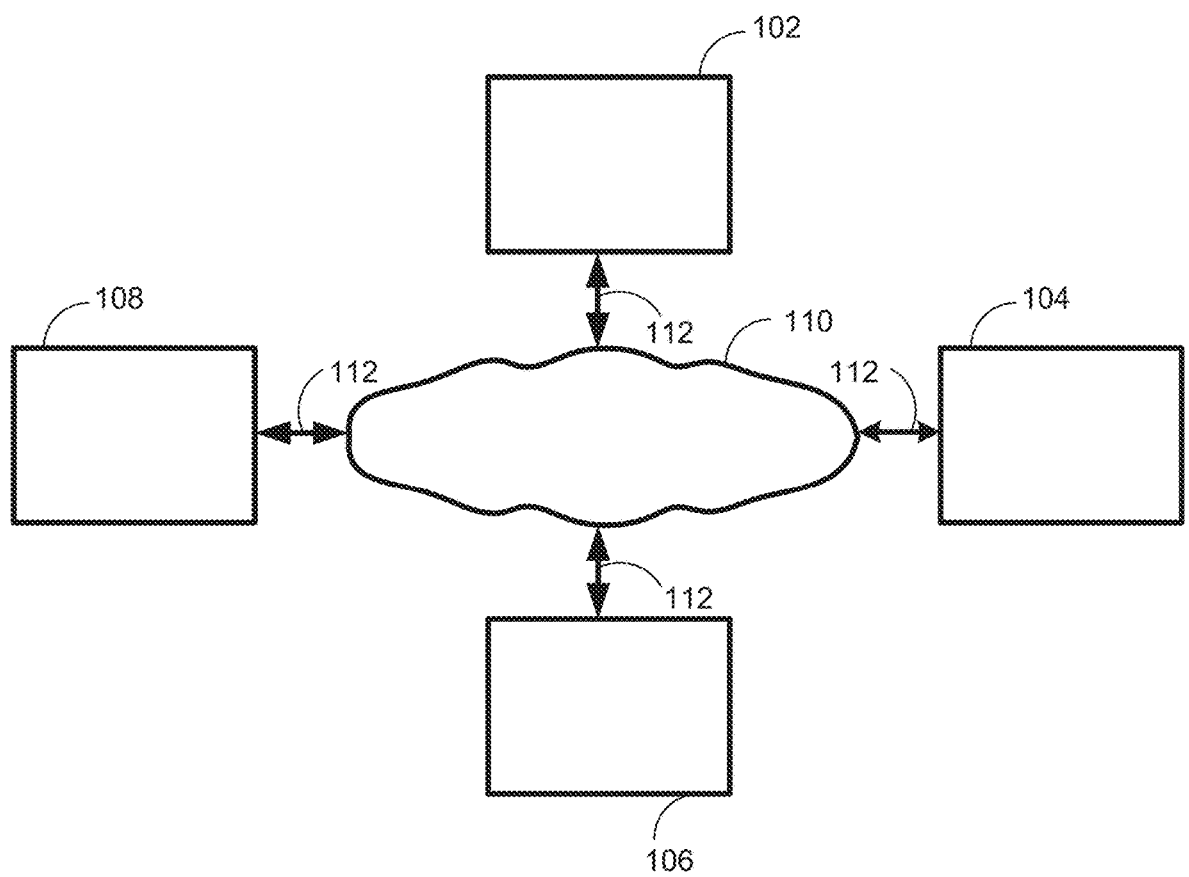
FIG. 1 is a diagram of a client-server computer system according to one aspect.

Various aspects of the disclosure are described more fully hereinafter with reference to the accompanying drawings. This disclosure may, however, be implemented in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects. Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. The detailed description and drawings are merely illustrative of the disclosure rather than limiting, the scope of the disclosure being defined by the appended claims and equivalents thereof.

DEFINITIONS

For purposes of the present application, it will be understood that the term "computer device" may refer to any hardware with at least one processor that is capable of manipulation and storage of digital data. Such a device may comprise a portable computing device, such as a mobile phone, a smartphone, a tablet, a laptop, a notebook computer, a personal digital assistant, a watch, or a virtual reality or augmented reality headset, as well as a conventional desktop computer or a server (that may provide data, computing resources, or programs to other computer devices over a network), or combinations thereof.

For purposes of the present application, it will be understood that the term "secure interface" may refer to a specific network location where data may be stored and displayed, and where a user may interact with protected digital content. Such secure interfaces may comprise a secure web page on a web site of an authentication company, for example, that is maintained on an encrypted server. A mobile application may also provide a secure interface for user interaction. Likewise, an augmented reality headset or similar virtual reality device or digital platform may also provide a secure interface for user interaction.

For purposes of the present application, it will be understood that the terms "object" and "item" and "asset" are synonymous, and each refers to a specific instance of a physical, real-world, tangible thing that may be owned and traded. The disclosure will provide many examples of such objects, and in this disclosure each is to be interpreted as being a non-fungible object that may be represented by an NFT.

For purposes of the present application, it will be understood that the term "authentication" refers to the process of showing or proving something to be true, genuine, or valid. For example, a particular physical object may be of increased interest or value because of its particular features or characteristics (e.g., origin, history, customization, endorsement, etc.). A collector may thus wish to verify the object in question is in fact the object that actually did undergo a particular journey that forms the basis of its attractiveness and value. Further, in token-based authentication systems, a buyer may wish to authenticate that the object in question is in fact the object represented by the associated token.

For purposes of the present application, it will be understood that the terms "tamperproof" and "tamper-resistant" are synonymous, and each refers to a device that is designed to be permanently attached to a specific physical object or physically incorporated into the specific physical object, such that attempts to remove or alter the device will cause visually apparent damage to it or render it inoperative. Such a device may serve as a unique identifier for the specific physical object, and so may be referred to in that terminology.

For purposes of the present application, it will be understood that the term "endorser" refers to a specific person, team or other group, or a representative of a team or other group who indicate that a specific physical object is genuine, often by providing testimony about the object and/or by manually autographing the object.

For purposes of the present application, it will be understood that the term "certificate of authenticity" or "COA" does not refer to a conventional certificate of authenticity. A conventional COA is often merely an easily forgeable or copyable and typically unattached printed document purportedly attesting to selected aspects of a specific physical object, such as its creator and its vendor.

Instead, here the term COA refers to a multimedia container that has a digital experiential presentation comprising at least one digital media file that can help show a potential buyer information indicating that an associated physical object is genuine. The media file may, for example, comprise a digital video file of any known format including, but not limited to, text, images, audio data, video footage, special effects, animations, three-dimensional model renderings, mixed reality objects, augmented reality objects, morphing visuals, biometric data, blockchain records, data visualizations, interactive elements, microscopy, geophysical elements, spectroscopy, chemical data, medical imaging, geographic data, special effects (e.g., OpenFX, VFX), or combinations thereof.

and combinations thereof, etc. The information shown in the media file may include a description of the physical object, its provenance, its manufacturing process, how it was endorsed, or combinations thereof, for example. The presentation is experiential in the sense that it portrays what an observer would see, hear, and/or read during the various activities that the specific physical object undergoes to become unique and distinctive. In some embodiments, media files can include content about the brand itself, e.g., brand information, that can be associated with the physical object, the COA, or both. The media files may include descriptions of what is unique or distinctive about the brand, for example, even without specifically mentioning the physical object. The COA is associated with a specific physical object via a tamperproof unique identifier, and may be stored on a secure server and displayed on a secure interface, e.g., a specific portion of an internet/web site that employs content controls.

Further, the COA may be rendered as an interactive three-dimensional virtual model or 3D COA that may be rotated to show video footage and images of the associated physical object from the digital media file. Different information may, for example, be presented on different sides of the virtual model. Such rendering is typically performed by a web browser application, such as that of an owner of the physical object, when viewing a corresponding secure interface. The COA (or 3D COA, treated as synonymous in this application) may be stored in a custodial wallet of the owner, with the custodial wallet stored on a secure server of a company providing authentication services, for example.

This application thus discloses a new approach for authenticating non-fungible physical objects by creating and indefinitely maintaining a physical and online chain of associations. A machine-readable tamperproof unique identifier that encodes data associating the identifier with a unique secure interface is permanently attached to a specific physical object. A multimedia container with a digital video file describing details of the creation, customization, and/or endorsement of the physical object and other information lending credibility to its asserted authenticity is stored and displayed on the secure interface, and serves as a digital 3D COA. After scanning the identifier and securely logging into the secure interface, a bona fide claimant (e.g., a buyer) may demand to claim ownership of the 3D COA. The process of claiming the 3D COA triggers the creation and storage of an NFT derived from the video file and corresponding metadata, along with custodial wallet identification data, on an externally verifiable blockchain. The blockchain may be a public blockchain or a private blockchain. The 3D COA may be similarly securely and verifiably transferred to a subsequent claimant.

The experiential presentation in the multimedia container may distinctively engage the interest of a potential buyer of the specific physical object and strengthen the association between the NFT and the specific physical object. The buyer may thus be more convinced that the specific physical object is authentic because the buyer can experience the process by which that particular object came to be what it is asserted to be.

In aspects, metadata can include:
- a unique identifier—a unique code or ID that differentiates each COA from others, crucial for tracking and verification;
- physical object description—detailed information about the physical object, including type, model, color, size, special features, or combinations thereof;
- creation Date—the date when the physical object was manufactured, created, or initially registered;
- creator/artist Information (also called endorser herein)—details about the creator, artist, manufacturer, or combinations thereof, including name, biography, contact information, or combinations thereof;
- ownership History—a record of all previous owners, including transfer dates and owner details, to trace the physical object's provenance;
- transaction records—detailed logs of each transaction involving the item, including sale dates, transaction amounts, and parties involved;
- digital signature—encrypted signatures from the creator, certifier, or current owner, ensuring the integrity and authenticity of the COA;
- media files—links or embedded files such as images, videos, and audio clips that showcase the item or explain its history;
- material details—information about the materials used in the item's construction, particularly for art or luxury goods.
- Manufacturing Process—Description of the techniques, tools, and processes used in the creation of the item;
- Geographical Data—Information on where the item was created, stored, or predominantly used;
- Authentication Steps—Detailed steps taken to authenticate the item, possibly including third-party verification;
- Blockchain Timestamp—The exact time the COA was recorded on the blockchain, providing a tamper-proof date stamp;
- Quality Certifications—Details of any quality standards or certifications the item meets;
- Restoration History—Records of any restorations or repairs the item has undergone, including dates and descriptions of the work performed;
- Exhibition History—For art or collectibles, a history of exhibitions or shows where the item was featured;
- Awards and Recognitions—Any awards, recognitions, or honors the item or its creator has received;
- Legal Status—Information on any legal claims, disputes, or restrictions associated with the item;
- Insurance Information—Details about insurance coverage, including policy numbers and insurance company details;
- QR Code or NFC Data—Data embedded in QR codes or NFC tags that link directly to the blockchain record;
- Ethical Sourcing Information—For items like jewelry or clothing, details about the ethical sourcing of materials;
- Cultural Significance—Information on the cultural or historical importance of the item, if applicable;
- Digital Twin Data—For technologically advanced items, a link to a digital twin or virtual replica;
- Environmental Impact—Information about the environmental impact of the item's production and lifecycle;
- Custom Metadata Fields—Any specific data fields that are uniquely tailored to the item's category or industry;
- Smart Contract Details—Information on any associated smart contracts, including functionalities like automatic royalty payments or ownership transfers;
- Interoperability Data—Metadata that ensures the COA can interact with other systems, platforms, or blockchains;
- Accessibility Features—Details on features that make the COA accessible to people with disabilities;
- Versioning Information—Details of any updates or versions of the COA, especially if amendments are made;
- Comments and Reviews—User-generated content such as comments, reviews, or testimonials about the item;
- Loyalty Points—Assign loyalty points for purchases or registrations that can be redeemed for discounts, special offers, or exclusive content;
- Membership Status—Provide metadata that reflects the owner's membership status, granting them access to special tiers of service or benefits;
- Exclusive Access—Offer metadata-linked exclusive access to events, previews, releases, or behind-the-scenes content;
- Warranty Information—Detailed information about warranty terms, duration, and what it covers, providing added security to the buyer;
- Certificates for Future Purchases—Include certificates or coupons that offer benefits on future purchases, encouraging continued engagement;
- Referral Bonuses—Metadata that tracks referral links or codes, offering rewards or discounts when new buyers purchase through existing owners;
- Virtual Goods—Provide access to virtual goods or services that complement the physical item, such as digital artworks, online courses, or virtual experiences;
- Customization Options—Offer metadata that allows the owner to access customization services for the product, enhancing personalization;
- Renewal Reminders—Embed reminders for product renewals, maintenance, or service checks, enhancing the longevity and performance of the product;

Upgrade Opportunities—Metadata that informs the owner about available upgrades or enhancements for their product;

Archival Access—Give owners access to a digital archive or library related to the item, its history, or its creator;

Serialized Content—Offer serialized digital content that continues the story of the item or adds contextual background over time;

Commemorative Plaques—For special editions or milestones, include metadata for digital or physical commemorative plaques;

NFTs as Proof of Attendance—For events related to the product or brand, include NFTs that serve as blockchain-based proof of attendance;

Gift Wrapping Options—Metadata that provides options for gift wrapping or special packaging for occasions;

Early Bird Specials—Early access or special pricing information for early adopters or pre-orders;

Digital Autographs—Offer digital autographs from creators or notable figures associated with the product, enhancing its collectible value;

Feedback Mechanisms—Include ways for owners to provide feedback or rate their experience, contributing to product improvement and customer satisfaction;

Carbon Offset Options—Metadata that includes options or records of carbon offsetting, appealing to environmentally conscious consumers;

Registry Inclusion—Offer inclusion in a registry or database that recognizes verified owners or collectors;

Maintenance Guides—Provide digital maintenance or care guides to help owners preserve the value and condition of their items;

Health and Safety Updates—For applicable products, offer ongoing updates about health and safety guidelines related to the use of the product;

Historical Documentation—Provide detailed historical documentation that adds depth and context to vintage or historically significant items;

Performance Data—For tech-oriented or sports-related products, include performance data that can help users improve their use or skills;

Subscription Services—Offer subscription-based services or content that complement the product, enhancing user experience;

Artistic Collaborations—Metadata about collaborations with artists or designers that add unique value to the product;

Patent Information—Include information about patents related to the product, highlighting its uniqueness and technological innovation;

Legal Aid or Advice—Offer access to legal advice or resources related to the product's use, ownership, or authenticity;

Conservation Efforts—Information about the brand's involvement in conservation efforts or sustainable practices, enhancing brand image;

Insurance Options—Provide options for insuring the product directly through linked metadata, facilitating easy access to insurance services;

or a combination thereof.

FIG. 1 illustrates a view of a client-server computing system 100 according to one aspect. The system 100 includes client devices 102, 104, 106 and server 108, which can communicate via communications links 112 over a network 110.

Client device 102 may comprise a portable computer device, such as a smartphone or tablet or laptop or notebook computer or watch or personal digital assistant or augmented/virtual reality headset, each of which is readily familiar to those of ordinary skill in the art, or other type of computer device. Additional similar client devices 104 and 106 are also shown. Each of the client devices 102-106 may be electronically linked to a communications network 110, through individual communications links 112 as may be known in the art. Communications network 110 may comprise the internet, for example.

Client device 102 may be owned by a person who is interested in buying a specific physical object from its creator or from a vendor, for example, referred to herein as a buyer computer device. Client device 104 may be owned by a person who is interested in buying a specific physical object from its first buyer or a subsequent buyer, or by a marketer who is interested in contacting such buyers since they have proven their interest in such objects. Client device 106 may be owned by a person who produces certificates of authenticity (COAs or 3D COAs) for a vendor or for a provider of authentication services. In one embodiment, 3D COAs may be produced in batches, though each 3D COA is associated with only one particular physical object. Collections of related 3D COAs may be grouped together into batches for easier management and tracking, such as for analyzing the effectiveness or popularity of a marketing campaign or facilitating customer engagement.

Server 108 may also be connected to communications network 110 through its own communications link 112. Server 108 generally includes one or more processors, memory, and instructions stored on the memory that cause the one or more processors to perform the functionality described herein. Server 108 can also include a data store, networking cards or interfaces and other equipment for performing the functionality described herein. The server 108 can be embodied as one or more computer devices located in a brick-and-mortar location, in the cloud, or both.

Server 108 may perform the functionality described herein. Server 108 may host a secure web site comprising a number of secure web pages as secure interfaces for a vendor and/or for a provider of authentication services, for example. Server 108 may additionally or alternatively communicate with an app running on a client device or provide a virtual interface to the client device, for example. Server 108 may additionally or alternatively provide a variety of online services, including creating a 3D COA for a specific physical object, displaying the 3D COA, maintaining records of ownership of the specific physical object and its associated 3D COA, creating an NFT derived from the 3D COA, and storing the NFT as an entry along with an owner's custodial wallet identifier on an externally verifiable blockchain.

Figure 2:
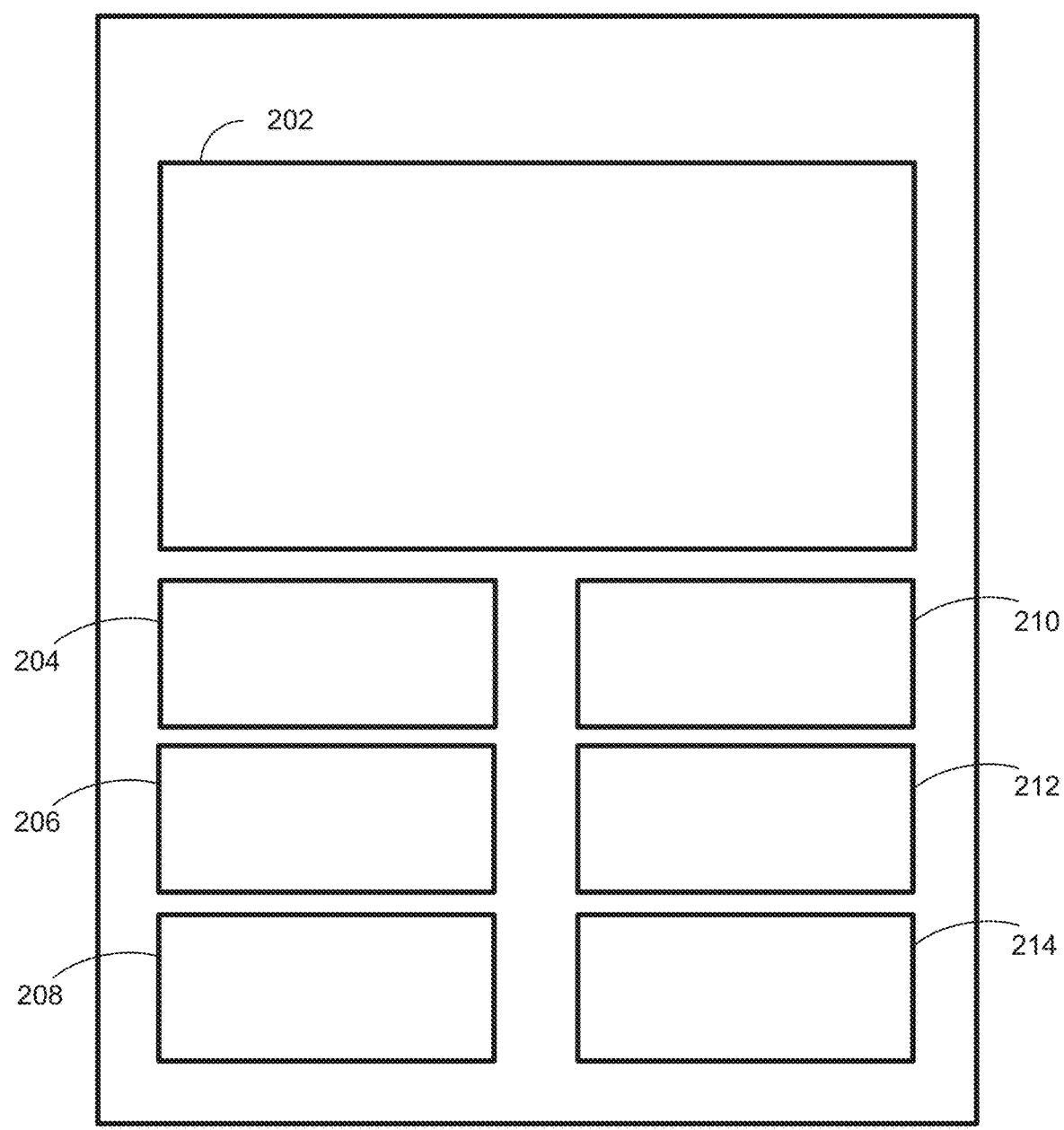
FIG. 2 is a diagram of a client computing device according to one aspect.

FIG. 2 illustrates a client device 102 according to one aspect. Client device 102 may further comprise a display 202, a processor 204, an input device 206, a battery 208, a main memory 210, a non-volatile storage device 212, and a communications interface 214 with an antenna, for example.

Client device 102 may represent, for example, computing or processing capabilities found within laptop and notebook computers, hand-held computing devices (personal digital assistants (PDAs), smart phones, cell phones, palmtops, etc.), mainframes, supercomputers, workstations or servers, or any other type of special-purpose computing devices as may be desirable or appropriate for a given application or environment. Client device 102 might also represent computing capabilities embedded within or otherwise available to a given device.

Display 202 may comprise a high-resolution color digital display screen capable of rendering images and video. Display 202 may be part of client device 102 or may be a separate device that renders information provided to it by client device 102. Display 202 may for example comprise an augmented or virtual reality interface device (e.g., a headset), a three-dimensional simulator, or other immersive environment as may be provided by a projector or holographic device.

The images and video may be captured from input device 206, such as a camera onboard client device 102, or may be received via communications link 112. Processor 204 may comprise, for example, one or more processors, controllers, control components, or other processing devices. Processor 204 might be implemented using a special-purpose processing engine such as, for example, a microprocessor, controller, or other control logic. Processor 204 may be connected to an internal bus, or other communication means to facilitate interaction with other components of client device 102 or to communicate externally.

Battery 208 may provide electrical power to operate client device 102. Memory 210 may comprise one or more memory components, simply referred to herein as the main memory. For example, random access memory (RAM) or other dynamic memory might be used for storing information and instructions in main memory 210 to be executed by processor 204. Main memory 210 might also be used for storing temporary variables or other intermediate information during execution of instructions to be executed by processor 204.

Client device 102 might likewise include a read only memory (ROM) or other non-volatile storage device 212 coupled to the bus for storing static information and instructions for processor 204. Such non-volatile storage devices 212 may include a media drive, such as a hard disk drive, a floppy disk drive, a magnetic tape drive, an optical disk drive, a solid-state disk drive, a compact disc (CD) or digital versatile disc (DVD) drive (read-only or read/write), or other removable or fixed media drive. Non-volatile storage devices 212 may also comprise network-attached storage systems and cloud-based storage services, for example. As these examples illustrate, non-volatile storage device 212 may include a computer usable storage medium having stored therein computer software or data.

Client device 102 also comprises a communications interface 214 operatively connected to an antenna to allow software and data to be transferred between client device 102 and external devices. Examples of communications interfaces might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interfaces known in the art. Software and data transferred via the communications interface might typically be carried on signals, which may be electronic, electromagnetic (which includes optical) or other signals capable of being exchanged by a given communications interface. These signals and might be implemented using either a wired or wireless communication links like communications links 112. Some examples of communications links 112 may include a phone line, a cellular link, an RF link, an optical link, a network interface, a local or wide area network, and other wired or wireless communications channels.

Generally, where components of the technology described are implemented in whole or in part using software in one aspect, these software elements may be implemented to operate with a computing or processing component capable of carrying out the functionality described. The client device 102 shown in FIG. 2 is thus an exemplary computing component that may represent multiple such components in practice. After reading this description, it will become apparent to a person skilled in the relevant art how to implement the technology using other computing components or architectures.

Further, in this document, the terms "computer program medium" and "computer usable medium" are used to generally refer to media such as, for example, memory 210 and non-volatile storage device 212. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable client device 102 to perform features or functions of the disclosed technology as discussed herein.

Figure 3:
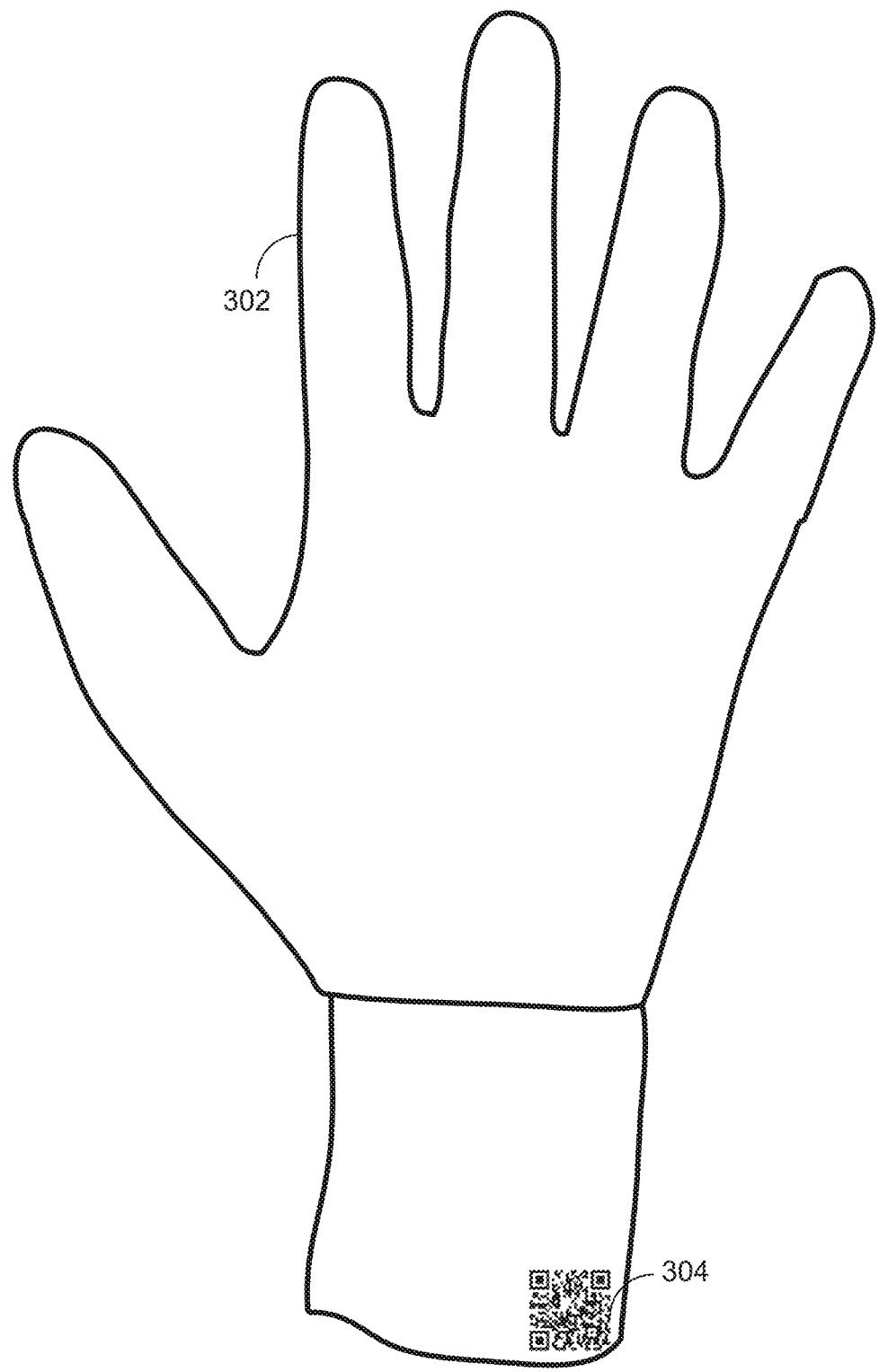
FIG. 3 is a diagram of a specific physical object having a tamperproof unique identifier attached thereto according to one aspect.

FIG. 3 illustrates a diagram of a specific physical object 300 having a tamperproof unique identifier 304 attached thereto according to one aspect. In this example, a glove 302 may comprise an ordinary sports glove available from many different manufacturers and vendors. However, this particular glove 302 has tamperproof unique identifier 304 permanently attached to it. Glove 302 may also be manufactured with tamperproof unique identifier 304 physically incorporated into it. The result is that glove 302 is now a specific physical object 300 that may be of increased interest and value to buyers if the tamperproof unique identifier 304 helps to assure or certify that this particular sports glove is extraordinary in some manner.

For example, specific physical object 300 may have been worn by a famous athlete during a famous national or global sporting event, such as a championship football game or an international sporting tournament. Or, this specific physical object 300 may have been worn by a celebrity musician at a particularly famous live performance or filming of a music video. The origin, creation, customization, and endorsement of specific physical object 300 may therefore distinguish it from all other similar objects, rendering it non-fungible. That is, this specific physical object 300 is not just any glove but is in fact THE specific authentic glove it is asserted to be.

Specific physical object 300 may comprise any real-world, tangible, physical item, or asset. For example, specific physical object 300 may comprise a manufactured good, a consumer good, a consumable product, a hand-made object, a collectible object, a printed object, an art object, a digital storage medium, a historical object, an apparel object, a sports memorabilia object, a high-value luxury object, an object with a specific geographic source association, a forensic evidence object, an object bearing a serial number, an autographed object, and combinations thereof. For example, specific physical object 300 may comprise a sealed object container or package such as a wine bottle or food package, a book, a photograph, a record album, a videotape, a sculpture, a painting, a letter, a printed certificate, a jewelry object, a watch, a ball, a jersey, a glove, a helmet, a toy, a firearm, a furniture object, a vehicle, an automotive component, a cosmetic object, a medical object, a pharmaceutical object, a semiconductor object, an aerospace component, and combinations thereof. As would be apparent to one of ordinary skill in the art after reading this description, many otherwise ordinary physical objects may become distinctive in a variety of ways, and such distinction may affect their desirability and market value.

Different types of tamperproof unique identifiers 304 may be selected for various product types. The type of tamperproof unique identifiers 304 used depends on the material and nature of the specific physical object 300 being authenticated. For example, tamperproof unique identifier 304 may comprise a device or label that is designed to be permanently attached to an object, and may include various security measures to prevent unauthorized removal or duplication. In one embodiment the tamperproof unique identifier 304 may comprise a single-use adhesive label that disintegrates upon removal, leaving a clearly visible "VOID" mark behind. In another embodiment, the tamperproof unique identifier 304 may comprise a hologram that is designed to be difficult to counterfeit. Some tamperproof unique identifiers 304 may be physically incorporated or integrated during manufacturing of specific physical object 300. Combinations of such security approaches may be combined.

Tamperproof unique identifier 304 may also comprise a barcode, QR code, or other machine-readable indicium thereon as may be known in the art, such as the exemplary QR code shown in FIG. 3. Packaged products may have unique QR codes printed directly onto the packaging or otherwise attached to or incorporated into the packaging during manufacture, for example. In one embodiment, tamperproof unique identifier 304 may also comprise a near field communication (NFC) chip, which is essentially a short-range radio frequency identification (RFID) chip. Higher-value luxury items may use this NFC technology, which is harder to duplicate than labels. More sophisticated NFC chips may even generate specific sequences of pseudorandom codes in response to being scanned, so that if a hacker tries to copy the NFC code currently being emitted, that will be insufficient to match a later code. Some NFC chips may be designed to detect whether a package has been opened, for example, and produce different outputs accordingly. Tamperproof unique identifiers 304 may also utilize cryptographic seals, microdot tagging, watermarks, magnetic stripes, color-shifting ink, invisible ink, thermochromic ink, chemical taggants, acoustic taggants, optical variable devices (OVDs), micro-embossing, anti-copying markers, or combinations thereof.

Throughout this application, the term "tamperproof unique identifier" refers not only to the labels or devices attached to or incorporated into specific physical objects, but also to data associating the label or device to a unique online interface link and other information that each such device may describe. For example, when scanned by a machine, either optically or via radio depending on the technology deployed, tamperproof unique identifier 304 may encode (and preferably obscure from a user) data associating the tamperproof unique identifier 304 with a particular secure interface, such as a secure web page, via a specific destination uniform resource locator (URL) and other identifying data. The other identifying data may be used to securely redirect a web browser from one web page to another, for example. The secure interface may be one of many secure web pages on a secure web site, which may be managed by an authorization company providing authentication services, for example. A home page, for example, may allow visitors to explore and interact with many web pages, while a secure web page generally disallows changes to be made to any content displayed or underlying stored data except by authorized persons.

Additional enhancements to the security and functionality of such a secure system may further comprise:

Encryption, which ensures the data encoded in tamperproof unique identifier 304, even if it is intercepted, cannot be deciphered without the proper decryption key.

Authentication protocols, which verify the scanning device or user has the authorization to access the encoded information.

Dynamic URLs, such as a one-time or limited-use URL, can prevent unauthorized access to the secure interface.

Redundancy checks, such as checksums or other data verification methods, ensure that the data read from tamperproof unique identifier 304 is accurate and has not been corrupted.

Access logging, i.e., tracking when and where tamperproof unique identifier 304 is scanned, can help track the movement of specific physical object 300 and identify any unauthorized attempts to access the data.

User interface elements or clear instructions guide legitimate users through the scanning and verification process.

Multifactor authentication may require additional verification beyond the scan, such as a password or a biometric check, especially for sensitive or high-value physical objects, e.g., specific physical object 300.

Revocation capability, which enables updates of the information associated with tamperproof unique identifier 304 if specific physical object 300 is compromised or the associated data needs to be changed.

Tamperproof unique identifiers 304 may be created by an authentication company, in one embodiment, and made available to persons who wish to certify that a specific physical object 300 is authentic. Those persons, or others, may then attach a selected tamperproof unique identifier 304 to such an object. The authentication company may generate barcodes or QR codes or program NFC chips, for example, in batches of a given specified size for such persons. Tamperproof unique identifiers may be visibly imprinted with the name and/or logo of the authentication company, and may incorporate various security features, not all of which may necessarily be disclosed. In one embodiment, each QR code may include an arbitrary ending comprising a string of characters that would be difficult to guess, even using automated methods, such as "/a08fh38fk193". Such a QR code ending may be used as the final suffix to a URL pointing to a specific secure interface like a web page; however, server 108 may immediately redirect a browser navigating to this web page to another web page that may have a different final URL suffix, perhaps based on a hash of the arbitrary ending. A user who scans the QR code may thus be directed to an initial interface and then redirected by server 108 to a specific secure interface, the actual URL of which may not be made visible to the user to enhance security.

Additionally, rate limiting may be used to control how frequently a user (or a hacker) can interact with a secure interface. Likewise, time-based access control can prevent access to a secure interface except during specific times. QR codes may also be designed to obfuscate the data they encode. Dynamic encryption keys may change with each user interaction with a secure interface, which makes it more difficult for potential attackers to gain access to data by predicting or stealing an encryption key. Finally, some NFC chips may contain non-sensitive information as a token representing sensitive data, where the non-sensitive information may be decrypted only by a secure token service.

Figure 4:
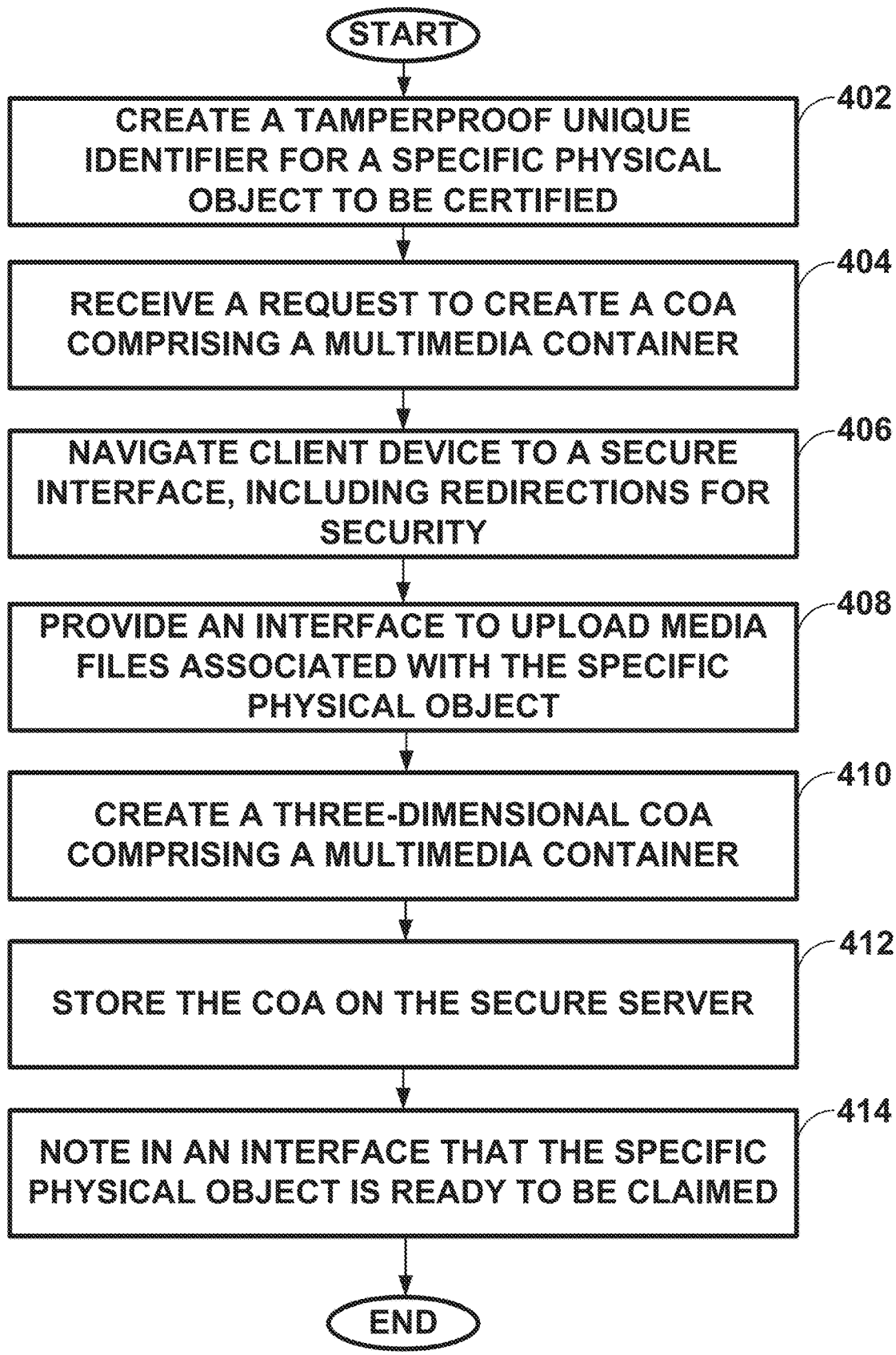
FIG. 4 is a diagram of a flowchart describing the operations for creating a certificate of authenticity (COA) according to one aspect.

FIG. 4 is a diagram of a flowchart 400 describing the operations for creating a three dimensional virtual certificate of authenticity (3D COA) 500 according to one aspect. A 402, the server 108 creates a tamperproof unique identifier 304 for the specific physical object 300 to be certified as authentic. Unlike a conventional COA, 3D COA 500 described herein comprises a multimedia container having a digital experiential presentation associated with the specific physical object 300 that is in turn associated with the attached tamperproof unique identifier 304.

A user may then attach tamperproof unique identifier 304 to specific physical object 300. The user may comprise the creator of specific physical object 300 or a vendor of specific physical object 300, for example. The user may create a number of 3D COAs 500 for a number of physical objects in a batch, with only one 3D COA 500 created for each specific physical object 300 in one embodiment. Unlike, for example, a car title that may be newly reissued by a government when a car is sold to a new owner, 3D COA 500 is generally not reissued but is permanently associated with the corresponding specific physical object 300.

At 404, the server 108 receives a request to create 3D COA 500 comprising a multimedia container. The request is received after the user scans, e.g., with client device 102, tamperproof unique identifier 304 attached to or incorporated into specific physical object 300. In one embodiment, merely scanning the identifier constitutes submitting the request for 3D COA 500 as previously described. The scanning may be optical or radio-based, depending on the type of tamperproof unique identifier 304 being used.

At 406, server 108 navigates client device 102, e.g., via a web browser to a corresponding secure interface for the specific physical object 300. As noted, this navigation may include directing the client device 102 to follow an initial URL plus one or more redirections for security purposes.

At 408, server 108 can provide a user interface to the client device 102 for the user to upload the digital experiential presentation via the client device 102. The experiential presentation may comprise at least one digital media file that can show a potential buyer evidentiary information indicating that an associated specific physical object 300 is genuine. For example, the presentation may reproduce what an observer had seen, heard, and read about the various activities that specific physical object 300 had undergone to become unique and distinctive, and thus authentic.

The media file may, for example, comprise a digital video file of any known video or digital multimedia format (e.g., MP4, .glb, .gltf, OBJ, three.js JSON, USDZ, Web-GL, etc.) containing text, images, audio data, video footage, special effects, animations, three-dimensional model renderings, documents, etc. The information shown in the media file may include a description of the features of specific physical object 300, its provenance (e.g., date and place of creation and its creator), its original vendor, its manufacturing process, its customization process, its history of known prior ownership, its history of inspection and quality assurance reports or government approvals, and events relating to its non-fungible nature and attendees of such events, for example. Such events could include award ceremonies, graduations, weddings, athletic competitions, business meetings, concerts, and any other significant happenings where specific physical object 300 and those persons associated with it were in attendance.

The information may also include how many related objects (if any) were created in a set or limited edition of such objects, its related legal protections (e.g., patents, trademarks, and copyrights), remarks from its creator or vendor, as well as narrations and related documentation, for example. Each presentation may also include a number of prior presentations, advertisements, and an identification of an authentication company managing 3D COA 500. The digital experiential presentation may also include audio and visual special effects and animations to help draw attention of a potential buyer.

The digital experiential presentation may also include at least one endorsement of the specific physical object 300 by at least one endorser. In this description, the term "endorser" may refer to a specific person or group who indicate or indicates or certifies that a specific physical object 300 is genuine. For example, an endorser may be a creator, an athlete, a coach, a sports team, a politician, an author, a sculptor, a business executive, an actor, a celebrity, a spokesperson, or other famous person who provides testimony about the specific physical object 300 and/or manually autographs the specific physical object 300. In one embodiment, the digital experiential presentation may include a complete record of the actual creation of the specific physical object 300 by an artist, for example. In another embodiment, the digital experiential presentation may include an athlete performing on the playing field, winning an award at a ceremony for the performance, and then signing the jersey or uniform worn while performing, for example. The specific physical object 300 may have tamperproof unique identifier 304 already attached or incorporated and shown in the presentation, in one embodiment. Thus, the presentation may provide quite irrefutable evidence of both the object's authenticity and the presence of an endorser at an event.

Server 108 can also provide the user interface to the client device 102 for the user to upload other digital files (e.g., media files) via the client device 102, to merely be stored by server 108. The capacity of the multimedia container of 3D COAs 500 described herein is finite (e.g., 1 MB to 2 GB). Thus, server 108 can store these additional files along with the 3D COA on a separate secure web page referred to as a "data room" provided by server 108 to display additional verifiable content to client device 102, enhancing the authenticity narrative.

At 410, the server 108 creates 3D COA 500 comprising the multimedia container having the files of the digital experiential presentation associated with specific physical object 300. In aspects, the server 108 links the information associated with tamperproof unique identifier 304 to specific physical object 300 and the associated multimedia container of 3D COA 500. That is, the act of creating 3D COA 500 ensures that 3D COA 500 is linked to specific physical object 300 and cannot be duplicated or counterfeited. 3D COA 500 thus comprises a recorded digital experience linking specific physical object 300 and tamperproof unique identifier 304.

One or more of the following steps and techniques can be utilized to create the 3D COA 500. Creating the 3D COA 500 can include defining one or more of a narrative, visual style, and interactive elements to be included in the 3D COA 500. Creating the 3D COA 500 can also include constructing the 3D environment in which the physical object can be placed. The 3D environment can include a physical studio, virtual studio, a stylized background, a realistic setting, or a combination thereof. Creating the 3D COA 500 can also include determining camera angles at which to place a camera relative to a COA product. For example, camera angles can be at positions of a camera relative to the physical object that provide for a certain lighting and visibility of the COA product. Creating the 3D COA 500 can also include determining an ambient light, point light, spot light, directional light, or a combination for the COA product. Creating the 3D COA 500 can also include creating a three-dimensional (3D) virtual model of the COA product. Creating the 3D virtual model can be performed by any technique known in the art with the aid of this disclosure, such as by sculpting, polygon modeling, procedural generation technique, or combinations thereof. Creating the 3D COA 500 can further include applying a texture to the 3D virtual model of the COA product by any technique known in the art with the aid of this disclosure, such as by UV mapping, bump mapping, shader development, of a combination thereof. Creating the 3D COA 500 can also include animating the 3D virtual model of the COA product by any technique known in the art with the aid this disclosure, such as by keyframe setting, rotation, scaling, or combinations thereof. In additional or alternative embodiments, creating the 3D COA 500 can also include animating the camera to move around the 3D environment, for example, in a manner that smoothly transitions from one view or focal point to another view or focal point. Creating the 3D COA 500 can also include adding or embedding a media file (or any combination of media files) in the multimedia container that is 3D virtual model of the COA product. In aspects, dynamic content such as a hologram, an augmented reality layer, an interactive hotspot, or combinations thereof can be added or embedded or otherwise integrated into the multimedia container. In some aspects, creating the 3D COA 500 can include embedding or adding an audio file to the multimedia container. Creating the 3D COA 500 can also include rendering each frame of an animation of the 3D virtual model. Creating the 3D COA 500 can also include combining the rendered frames into a video sequence. In some aspects, visual effects can be added, exemplary visual effects include but not limited to depth of field, motion blur, color grading, or combinations thereof. In aspects where the 3D COA 500 is interactive, elements can be added to the frames in the video sequence, such as clickable areas of the frame(s) or information pop-up windows in the frame(s). Creating the 3D COA 500 can also include formatting the video sequence of the 3D virtual model of the 3D COA 500 into a video file format, such as .mp4 format. Creating the 3D COA 500 can also include incorporating specific information onto the 3D COA 500, such as a serial number, tamperproof unique identifier, or both. Alternatively, the specific information can be incorporated into a UI overlay of the 3D COA 500.

In one embodiment, the server 108 can render or otherwise display 3D COA 500 as a three-dimensional virtual model on display 202 of client device 102. In effect, 3D COA 500 and its three-dimensional virtual model are synonymous, for purposes of this application. Third party applications may also be authorized to render 3D COA 500 using information provided by server 108, for example. In another embodiment, the 3D COA 500 may also become visible to the public once claimed and added to the blockchain, so it may be renderable on other marketplaces. A rendered 3D COA 500 would not be claimable however, unless transferred by its owner. In aspects, the three-dimensional virtual model may be displayed by the server 108 on any other device that requests to view 3D COA 500 (e.g., via the secure interface described or an online marketplace for 3D COAs 500 that is managed by server 108 or other market provider), including displays of portable computing devices and augmented reality headsets. In aspects, 3D COA 500 may thus be an augmented reality object. In aspects, the server 108 can send the 3D COA 500 to a merchant server of an online marketplace, such as eBay or Amazon, which can render the 3D COA 500 and receive information via an API that facilitates communication of the server 108 with the merchant servers.

At 412, 3D COA 500 is stored on the secure server that is associated with tamperproof unique identifier 304. Such storage is preferably permanent.

At 414, a specific user interface device may be created on the secure interface to indicate that 3D COA 500 is available to be claimed. Such a user interface device may comprise a large, colored button (e.g., red), marked "CLAIM" to help a visitor to the secure web page recognize that the corresponding specific physical object 300 is available.

Figure 5:
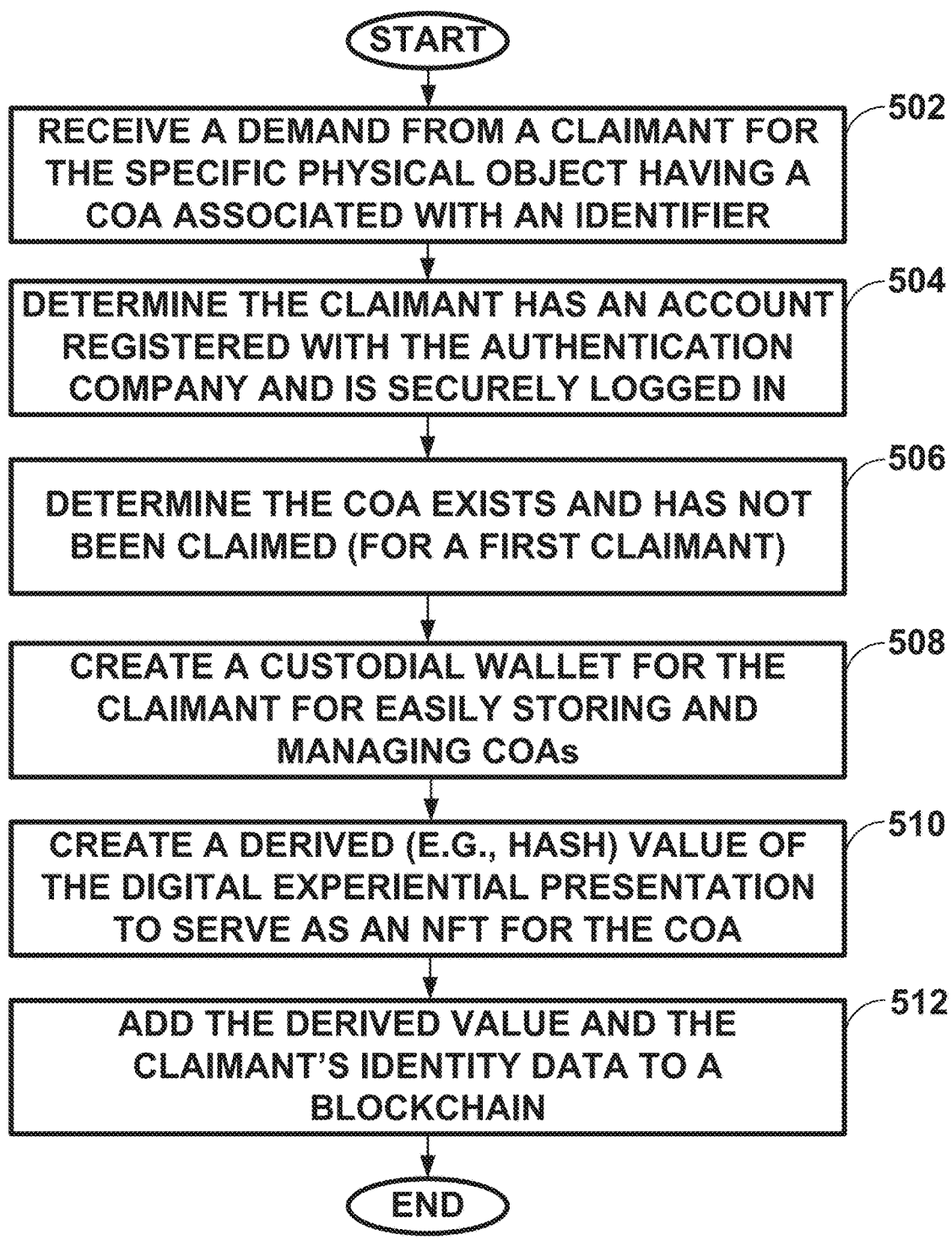
FIG. 5 is a diagram of a flowchart describing the operations for claiming a COA according to one aspect.

FIG. 5 is a diagram of a flowchart 501 describing the operations for claiming 3D COA 500 according to one aspect. The flowchart 501 actions are performed by server 108, unless otherwise noted. A claimant may comprise a buyer of specific physical object 300 who wishes to be associated with 3D COA 500 for that object, typically by owning specific physical object 300. As with the process of creating the 3D COA 500 described above, a claimant may scan tamperproof unique identifier 304 and be directed to the secure interface, where 3D COA 500 now exists. As noted, a user interface device may be added to this secure interface inviting the claimant to claim 3D COA 500, such as by clicking on a prominent button on the secure interface. Alternatively, a claimant may visit an internet marketplace managed by server 108 that displays the three-dimensional rendering of the 3D COA 500 for purchase by claimant.

At 502, server 108 receives a demand from a claimant. Client device 102, for example, can view the secure interface hosted by server 108, where server 108 displays, for example, the specific secure web page containing 3D COA 500. Client device 102 can interact with the secure interface to select the user interface device to claim 3D COA 500, making client device 102 effectively the claimant. Thus, the selection received by server 108 is the demand.

At 504, the server 108 determines that the claimant has an account registered with the authentication company, which typically requires the claimant to provide, via client device 102 to server 108, identity data and a username and password to log in securely. If that is not the case however, the claimant may be directed to a registration and login page (not shown). Once the claimant is registered and logged in securely, the method proceeds to the next step. In one embodiment, a claimant who is a user of an authorized electronic commerce marketplace company could also securely access server 108 using a username and password for that company instead of credentials for the authentication company.

At 506, server 108 determines whether 3D COA 500 exists and whether it has been previously claimed by a previous claimant. COA 500 should exist but should not have been previously claimed in the case of an initial claimant; failure of either condition causes an error state. The system described herein includes measures to prevent hackers' bots from automatically claiming COAs 500 and to ensure that only the legitimate owner of the specific physical object can claim associated COA 500.

At 508, server 108 can create a secure custodial wallet for the claimant for storage of COA 500. The custodial wallet allows the claimant (now object owner) to manage one or more COAs 500 conveniently. The claimant thus need not manually manage private keys or other technical aspects of the system. A custodial wallet owned by a given claimant may be identified by a custodial identifier.

At 510, an NFT derived from 3D COA 500 may be calculated based on the digital video file. The NFT may comprise a hash value of the digital video file in one embodiment. A hash value provides a compact unique digital summary of the contents of the file. Any change to the file will alter the hash value.

At 512, the derived (e.g., hash) value of 3D COA 500, along with the claimant's custodial wallet identifier or related data is added to a blockchain. A blockchain is a cryptographically secure digital ledger, wherein later entries may be added and are each encrypted according to a prior entry to prevent tampering or deletion from going undetected. Individual entries on a blockchain may be externally validated, as is familiar to those of ordinary skill in the art. The custodial wallet securely assigned to the claimant is thus effectively the "owner" of 3D COA 500, at least until the claimant may elect to transfer it elsewhere.

The claimant may also specify which, if any, future interactions regarding specific physical object 300 are to be allowed. Marketers are interested in establishing and maintaining relationships with consumers of their products, for example, and may contact owners of specific physical object 300 based on their proven object interest. Claimants may elect to participate in such relationships, which could include receiving additional information from marketers and participating in rewards programs. Marketers may thus encourage claimants to collect and authenticate more objects and to associate with other claimants and/or related marketers. Claimants may filter the interactions they allow according to which batch a given 3D COA 500 belongs to, e.g., to identify other pieces in a limited edition as they become available or authenticated, so claimants can "collect them all" as it were. Management of 3D COAs 500 by batches may also provide organized metadata about the brands or organizations that created the 3D COAs 500.

The process of claiming 3D COA 500 may be repeated by legitimate subsequent claimants. Thus, server 108 as described enables a marketplace for specific physical objects (e.g., including specific physical object 300) that are linked to both tamperproof unique identifiers 304 physically and to 3D COAs 500 cryptographically, fostering trust between brands and consumers. The system's dual focus on security (through tamperproof devices) and engagement (via experiential storytelling and blockchain transparency) represents a significant leap in product authentication and consumer-brand interaction. The disclosure thus provides consumers with a secure and engaging way to verify the authenticity of the products they purchase, while also providing brands with a means to communicate directly with their customers and share additional information about their products.

Figure 6:
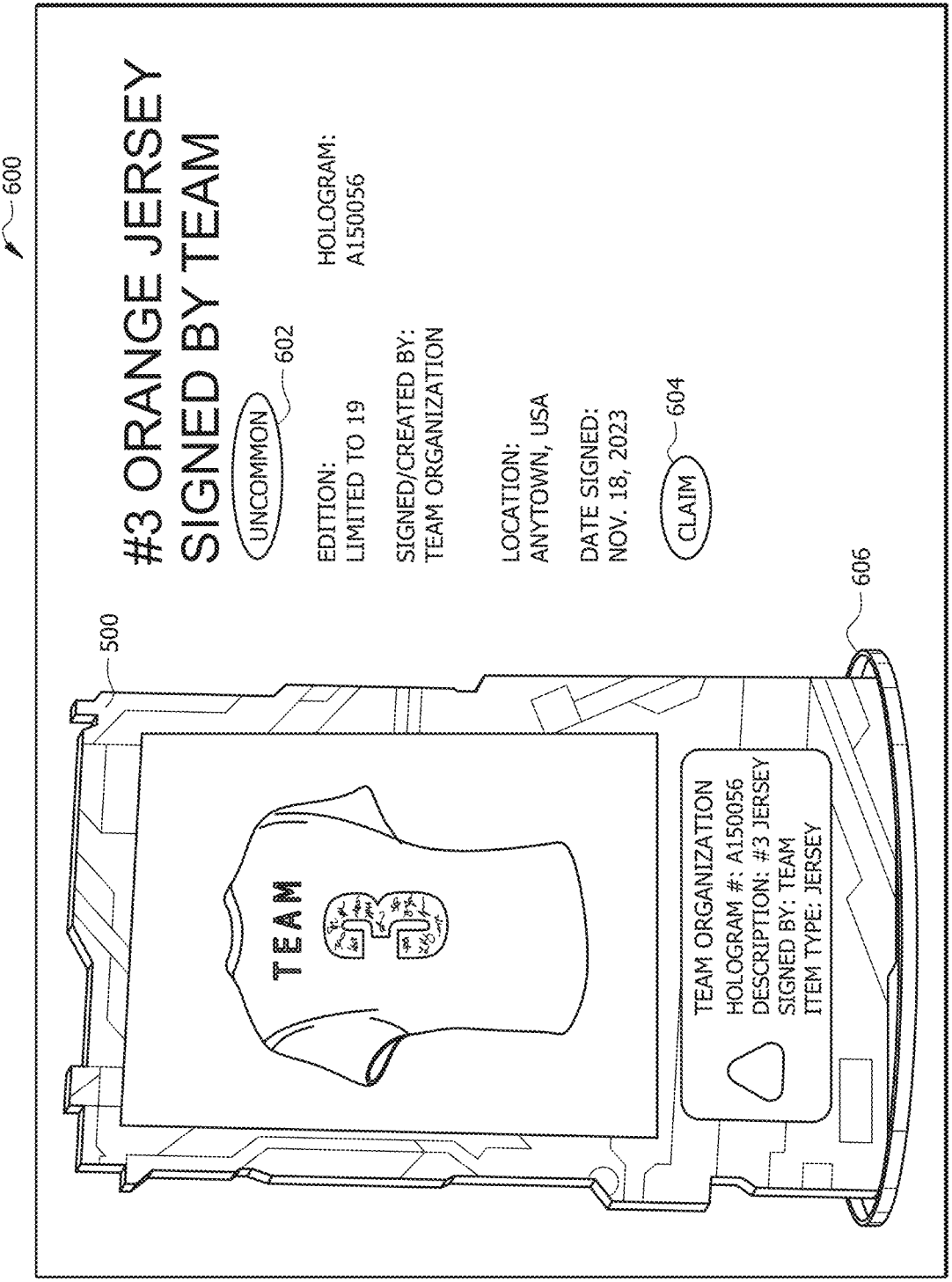
FIG. 6 is a diagram of a secure interface with a three-dimensional (3D) representation of a COA according to one aspect.

FIG. 6 is a diagram of a secure interface 600 with a three-dimensional representation or virtual model of 3D COA 500 according to one aspect. This diagram reproduces the secure interface 600 on server 108 after 3D COA 500 has been created but not yet claimed. Secure interface 600, e.g., a secure web page, provides text data from the data room, describing specific physical object 300, which in this case is a jersey signed by all the members of a sports team. The text provided includes a title, a hologram number, an indication of how many such physical objects of a limited edition were created, who signed the object, and when and where the object was signed, in this example.

Different user interface popups 602 may be provided to summarize how rare the specific physical object 300 is, based on the number of 3D COAs 500 created for the limited edition. For example, "Unique" could indicate there is only one 3D COA, "Rare" could indicate there are two to ten 3D COAs for the set of similar objects, "Uncommon" could indicate there are eleven to fifty 3D COAs, etc. A button 604 is also provided as a user interface device for a claimant to click to claim 3D COA 500.

A first three-dimensional rendering 606 of a first (e.g., the front) side of 3D COA 500 is presented. Rendering 606 is designed, in this example, to be reminiscent of a traditional baseball card, which featured a photograph of a player on the front side and various text describing the player's performance statistics on the back side. In this instance, rendering 606 provides a photograph of specific physical object 300. However, rendering 606 may also include animations, audio data, and audio and visual special effects to make rendering 606 more attractive. Rendering 606 may also rotate the photograph back and forth and/or zoom in to some extent, either automatically or in response to inputs from a viewer, to provide a more interesting experience to a viewer. Rendering 606 may also feature an animated device indicating which authentication company maintains 3D COA 500, shown here as a potentially rotating ribbon along the bottom of rendering 606.

Secure interface 600 or a home page of the authentication company may include a number of such renderings, depicting various aspects of the experiential presentation previously described that a user may explore. For example, one rendering may depict the original creation of specific physical object 300, while others may depict video from an associated event, while still others may depict the endorsement process.

Further, the home page of an authentication company may depict a number of recently authenticated physical objects, allowing visitors to observe various objects that have been authenticated using the system, and their different three-dimensional renderings, for example.

Figure 7:
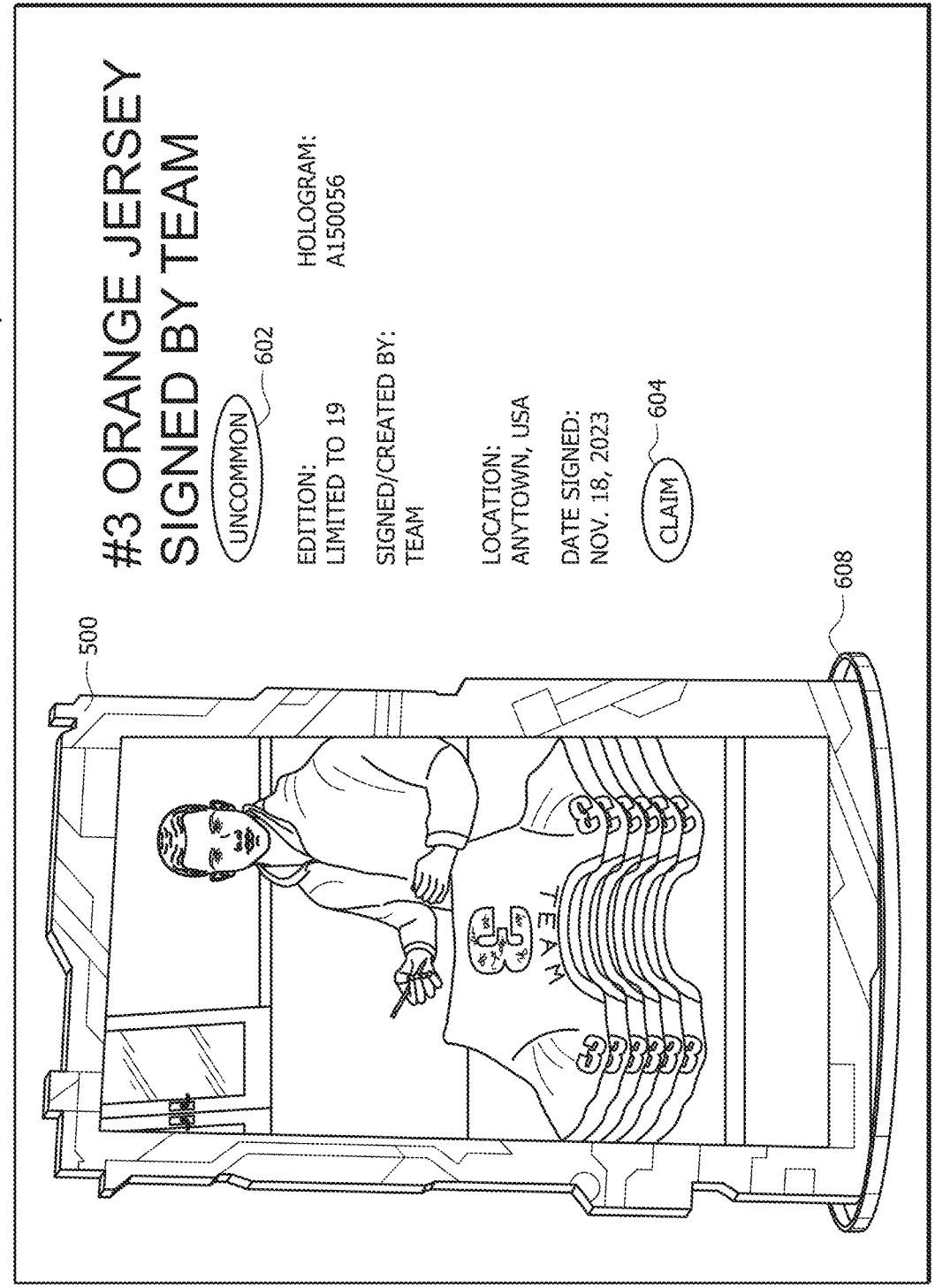
FIG. 7 is another diagram of the secure interface with another view of the three-dimensional representation of the COA according to one aspect.

FIG. 7 is another diagram of the secure interface 600 with another three-dimensional rendering 608 of 3D COA 500 according to one aspect. Three-dimensional rendering 608 shows a different side of 3D COA 500, in this instance. In this example, 3D COA 500 may rotate from the front side to show the rear side, which includes a video of the various team members each manually signing specific physical object 300. Any style of rendering depicting some or all of the experiential presentation content may be used to capture the interest of potential buyers. For example, 3D COA 500 may be first represented by rendering 606, followed by an animation rotating the "baseball card" style rendering so that another side (e.g., rendering 608) may be depicted. However, any style of rendering, e.g., having more than two sides, may be provided.

For example, such renderings may loop repeatedly, with user interface controls provided to allow a viewer to interact with the renderings, such as to pause the presentation and alter presentation speed, audio levels, and display size, and to share a link to the presentation with others. Three-dimensional renderings may morph or vary or rotate through any number of sides to show photographs, videos, text, logos, animations, play audio jingles, and any other type of content from the experiential presentation of 3D COA 500 as marketers or claimants may desire.

Although the disclosure thus far has described a one-to-one evidentiary linkage between a single specific physical object 300 and a single certificate of authenticity (3D COA) 500, the disclosure is not limited to this type of association. In other embodiments, a 3D COA 500 may serve as a "master" COA for a collection of specific physical objects 300, such as the limited edition previously mentioned, providing a one-to-many association. Further, a specific member number may be assigned to each specific physical object 300 in a collection, and each specific physical object 300 may have a tamperproof unique identifier attached that now also encodes the specific member number. A batch of individual 3D COAs may be created for the collection, following the process previously described for each specific physical object 300 for the 1:1 association case, except that now each individual 3D COA will incorporate the specific member number for each item so each individual 3D COA will be unique.

Another difference with the one-to-many embodiments is that instead of deriving the NFT from the master COA alone, the NFT is now derived from the individual 3D COA, and thus both the master COA for the collection and the specific member number. Thus, a unique NFT may be created for each member of the collection associated with the single master COA. The blockchain may therefore contain separate entries for each member of the collection purchased by one or more buyers. In one embodiment, the batch of individual 3D COAs may be created only when the first claimant claims the first member of the collection. This embodiment enables a high volume of objects to be uniquely and securely authenticated following the concepts previously described, with only minor modification.

This disclosure also encompasses an embodiment which can authenticate that a specific person attended a specific event, even if specific physical object 300 bearing a tamperproof unique identifier was merely displayed at the event but was not given to the attendee or to any attendees at the event. The attendee may create a "verification of attendance," or "VOA," analogous in concept to a 3D COA 500 for a physical object but different in that it is based solely on the attendee's actual attendance at the event. In this embodiment, if the attendee has, for example, a captured image of the tamperproof unique identifier 304 attached to a specific physical object 300 that was displayed at the event, that captured image may enable the attendee to navigate to a secure interface established for the event. A particular mobile application may be required to decrypt the QR code used to verify attendance, thus preventing anyone from merely transferring a captured image of the QR code to someone else to claim the VOA. Additionally, the event may be geo-fenced and time-locked, such that an attendee must attend the event within physical location and time constraints.

The attendee may then upload at least one private media file to the experiential presentation when submitting the request, enabling the attendee to create a unique 3D VOA even without possessing a physical object at all. Such a private media file could be a photograph taken by the attendee at the event (e.g., a "selfie") or a video of a portion of the event, or any other private file not available to others that nonetheless lends credibility to the assertion of event attendance. The private media file may be encrypted by the attendee, for example, to keep it private. The VOA may be stored and displayed as previously described with regard to an ordinary 3D COA 500, including being added to a blockchain.

Embodiments for VOAs for attending a digital event are also within the scope of this disclosure. A user may attend a digital event, such as a livestream on the internet, during which an advertisement or QR code may be displayed. The user may click on the advertisement or scan the QR code, and then be navigated to a VOA page where the VOA may be claimed. The digital event may require multi-factor authentication to prove the attendee attended, for example, and may utilize the geo-fenced and time-locked constraints previously mentioned.

Further, a group of attendees may elect to share a number of VOAs describing their individual experiences at the event in a commemorative album. Additionally, an attendee may acquire a physical item at a later time to be certified post-facto with respect to the event, but the attendee may nonetheless accordingly certify that the item is owned by an authentic event attendee.

The disclosure thus leverages immersive experiences to certify product authenticity and event attendance. The described system also enriches the connection between brands, creators, and consumers with sustained value and trust. Further, the disclosure provides comprehensive data insights for marketers to better understand consumer behavioral data and drive superior customer engagement.

The integration of blockchain technology secures the authentication process against tampering and fraud and introduces a tokenized structure of ownership, providing a pioneering solution in product authenticity and digital storytelling. This disclosure ensures that the COAs are transparent, immutable, and easily verifiable, increasing consumer trust in the authenticity of the products they purchase. The disclosure also provides an engaging way for consumers to verify the authenticity of physical products, while also enabling brands to communicate directly with their customers and to share additional information about their products.

ADDITIONAL DESCRIPTION

Aspect Set A

Aspect 1. A method comprising: receiving, by a server, a request to generate a three-dimensional digital certificate of authenticity (3D COA) for a physical object; receiving, by the server from a computer device, one or more digital files containing information corresponding to the physical object; and creating, by the server, the 3D COA, wherein the 3D COA comprises a multimedia container comprising an experiential presentation with one or more digital media files associated with the physical object.

Aspect 2. The method of Aspect 1, further comprising: displaying, by the server, on a display of a buyer computer device, the 3D COA as a rotatable three-dimensional virtual model having at least a first side and a second side, wherein the one or more digital media files associated with the physical object are displayed on the first side and the second side of the rotatable three-dimensional virtual model.

Aspect 3. The method of Aspect 1 or 2, wherein the one or more digital media files comprises a photograph format file comprising an image of the physical object and a video format file comprising a creation of the physical object, wherein the photograph format file is displayed on the first side and the video format file is displayed on the second side.

Aspect 4. The method of any one of Aspects 1 to 3, wherein the one or more digital files is in a photograph format, a video format, or combinations thereof, wherein the information includes a description of the physical object, a provenance of the physical object, a manufacturing process for the physical object, or combinations thereof.

Aspect 5. The method of any one of Aspects 1 to 4, further comprising: storing, by the server in a data store, the one or more digital files.

Aspect 6. The method of any one of Aspects 1 to 5, further comprising: generating, by the server, a tamperproof unique identifier for the physical object; and linking, by the server, the tamperproof unique identifier to the physical object.

Aspect 7. The method of any one of Aspects 1 to 6, further comprising: receiving, by the server, from a buyer computer device that scanned the tamperproof unique identifier, a demand to transfer ownership of the 3D COA; directing, by the server, the buyer computer device to a secure interface displaying the 3D COA; interacting, by the server, with the buyer computer device, to confirm the buyer computer device represents a bona fide buyer for the 3D COA and to create a buyer custodial wallet associated with the buyer computer device; generating, by the server, i) a non-fungible token (NFT) representing the 3D COA and ii) a cryptographic identifier for the NFT; adding, by the server, the NFT and a custodial wallet identifier of a buyer to a blockchain; and storing, by the server, the NFT and the 3D COA to a buyer custodial wallet.

Aspect 8. The method of Aspect 7, wherein the buyer is a subsequent buyer.

Claus 8A. The method of any one of Aspects 1 to 8, wherein creating the 3D COA can include one or a combination of defining one or more of a narrative, visual style, and interactive elements to be included in the 3D COA; constructing the 3D environment in which the physical object can be placed; determining camera angles at which to place a camera relative to a COA product; determining an ambient light, point light, spot light, directional light, or a combination for the COA product; creating a three-dimensional (3D) virtual model of the COA product; applying a texture to the 3D virtual model of the COA product; animating the 3D virtual model of the COA product; animating the camera to move around the 3D environment, for example, in a manner that smoothly transitions from one view or focal point to another view or focal point; adding or embedding a media file (or any combination of media files) in the multimedia container that is 3D virtual model of the COA product; adding or embedding dynamic content such as a hologram, an augmented reality layer, an interactive hotspot, or combinations thereof into the multimedia container; embedding or adding an audio file to the multimedia container; rendering each frame of an animation of the 3D virtual model; combining the rendered frames into a video sequence; adding visual effects; formatting the video sequence of the 3D virtual model of the 3D COA 500 into a video file format; incorporating specific information onto the 3D COA or into a UI overlay of the 3D COA.

Aspect 9. A computer program product comprising a non-transitory computer-readable medium with computer executable instructions tangibly embodied thereon that, when executed by a processor, create a digital certificate of authenticity (COA) for a specific physical object by: creating a tamperproof unique identifier for the specific physical object; in response to a request from a user, creating the COA comprising a multimedia container having a digital experiential presentation that is associated with the specific physical object by the tamperproof unique identifier; and storing the COA on a secure interface that is associated with the tamperproof unique identifier.

Aspect 10. The computer program product of Aspect 9, wherein the tamperproof unique identifier is attached to the specific physical object, wherein the specific physical object is one of unique and a member of a set of a limited number of physical objects, and wherein each member of the set has a unique member number assigned for creation of a unique COA.

Aspect 11. The computer program product of any one of Aspects 9 to 10, wherein the specific physical object comprises one of a manufactured consumer good, a consumable product, a hand-made object, a collectible object, a printed object, an art object, a digital storage medium, a historical object, an apparel object, a sports memorabilia object, a high-value luxury object, an object with a specific geographic source association, a forensic evidence object, an object bearing a serial number, an autographed object, a sealed object container, a book, a photograph, a record album, a videotape, a sculpture, a painting, a letter, a printed certificate, a jewelry object, a watch, a ball, a jersey, a helmet, a toy, a bottle, a firearm, a furniture object, a vehicle, an automotive component, a cosmetic object, a medical object, a pharmaceutical object, a semiconductor object, an aerospace component, and combinations thereof.

Aspect 12. The computer program product of any one of Aspects 9 to 11, wherein the tamperproof unique identifier encodes and obscures data associating the tamperproof unique identifier with the secure interface via a specific uniform resource locator (URL).

Aspect 13. The computer program product of any one of Aspects 9 to 12, wherein the tamperproof unique identifier comprises a machine-readable indicium comprising at least one of a single-use adhesive label, a permanently attachable physical token, an integral indicium, a permanently attachable hologram, a near field communication (NFC) chip, a cryptographic seal, a microdot tag, a watermark, a magnetic stripe, a color-shifting ink, an invisible ink, a thermochromic ink, a chemical taggant, an acoustic taggant, an optical variable device, a micro-embossing, and an anti-copying marker.

Aspect 14. The computer program product of any one of Aspects 9 to 13, wherein the tamperproof unique identifier includes at least one of a barcode and a QR code.

Aspect 15. The computer program product of any one of Aspects 9 to 14, wherein the digital experiential presentation comprises a video file comprising at least one of text, audio, photographs, video footage, special effects, and three-dimensional virtual models.

Aspect 16. The computer program product of any one of Aspects 9 to 15, wherein the secure interface is controlled by an authentication company and contains additional verifiable evidentiary information and virtual three-dimensional models of the COA.

Aspect 17. The computer program product of any one of Aspect 9 to 16, wherein the secure interface is secured via redirections from initial web pages based on the tamperproof unique identifier.

Aspect 18. The computer program product of any one of Aspects 9 to 17, wherein the user comprises one of a creator of the specific physical object and a vendor of the specific physical object.

Aspect 19. The computer program product of any one of Aspects 9 to 18, further comprising: displaying the specific physical object only to attendees of an event attended by the user; customizing the request with a private media file from the user comprising evidentiary information to be included in the digital experiential presentation to associate the user with the event as an attendee; and creating the COA as only a verification of attendance (VOA) that may be claimed by the user.

Aspect 20. The computer program product of any one of Aspects 9 to 19, further comprising: in response to a claimant scanning the tamperproof unique identifier to generate the request, directing the claimant to a registration and login interface; in response to the claimant completing a registration and securely logging in, redirecting the claimant to the secure interface; and in response to receiving a demand from the claimant: creating a custodial wallet for the claimant where the claimant may store and manage collected COAs; and adding an entry comprising a custodial wallet identifier and a non-fungible token (NFT) derived from the COA to a blockchain, to cryptographically secure an immutable and externally verifiable association between the claimant and the specific physical object.

Aspect 21. The computer program product of Aspect 20, wherein the blockchain is one of a public blockchain and a private blockchain.

Aspect 22. The computer program product of Aspect 20 or 21, wherein the NFT comprises a hash of the digital experiential presentation.

Aspect 23. The computer program product of any one of Aspects 20 to 22, further comprising securely transferring ownership of the COA from the claimant to a subsequent claimant by: confirming that the COA exists and has been claimed by the claimant; and repeating previous claimant actions by the subsequent claimant.

Aspect 24. The computer program product of any one of Aspects 20 to 23, further comprising enabling at least one of a creator of the specific physical object and a vendor of the specific physical object to communicate directly with claimants.

Aspect 25. The computer program product of any one of Aspects 20 to 24, further comprising providing claimants access to a rewards program, to encourage claimants to claim the COA for each specific physical object owned.

Claus 25A. The computer program product of any one of Aspects 9 to 25, wherein creating the 3D COA can include one or a combination of defining one or more of a narrative, visual style, and interactive elements to be included in the 3D COA; constructing the 3D environment in which the physical object can be placed; determining camera angles at which to place a camera relative to a COA product; determining an ambient light, point light, spot light, directional light, or a combination for the COA product; creating a three-dimensional (3D) virtual model of the COA product; applying a texture to the 3D virtual model of the COA product; animating the 3D virtual model of the COA product; animating the camera to move around the 3D environment, for example, in a manner that smoothly transitions from one view or focal point to another view or focal point; adding or embedding a media file (or any combination of media files) in the multimedia container that is 3D virtual model of the COA product; adding or embedding dynamic content such as a hologram, an augmented reality layer, an interactive hotspot, or combinations thereof into the multimedia container; embedding or adding an audio file to the multimedia container; rendering each frame of an animation of the 3D virtual model; combining the rendered frames into a video sequence; adding visual effects; formatting the video sequence of the 3D virtual model of the 3D COA 500 into a video file format; incorporating specific information onto the 3D COA or into a UI overlay of the 3D COA.

Aspect 26. A system for creating a digital certificate of authenticity (COA) for a specific physical object, comprising: a server configured to perform any of the functionality described for the method of Aspects 1 to 8A, including creating a tamperproof unique identifier for the specific physical object; and creating a 3D COA comprising a multimedia container having a digital experiential presentation that is associated with the specific physical object by the tamperproof unique identifier.

Aspect 27. The system of Aspect 26, wherein creating the 3D COA can include one or a combination of defining one or more of a narrative, visual style, and interactive elements to be included in the 3D COA; constructing the 3D environment in which the physical object can be placed; determining camera angles at which to place a camera relative to a COA product; determining an ambient light, point light, spot light, directional light, or a combination for the COA product; creating a three-dimensional (3D) virtual model of the COA product; applying a texture to the 3D virtual model of the COA product; animating the 3D virtual model of the COA product; animating the camera to move around the 3D environment, for example, in a manner that smoothly transitions from one view or focal point to another view or focal point; adding or embedding a media file (or any combination of media files) in the multimedia container that is 3D virtual model of the COA product; adding or embedding dynamic content such as a hologram, an augmented reality layer, an interactive hotspot, or combinations thereof into the multimedia container; embedding or adding an audio file to the multimedia container; rendering each frame of an animation of the 3D virtual model; combining the rendered frames into a video sequence; adding visual effects; formatting the video sequence of the 3D virtual model of the 3D COA 500 into a video file format; incorporating specific information onto the 3D COA or into a UI overlay of the 3D COA.

Aspect Set B

Clause 1. A method comprising: receiving, by a server, a request to generate a three-dimensional digital certificate of authenticity (3D COA) for a physical object; receiving, by the server from a computer device, one or more digital files containing information corresponding to the physical object; and creating, by the server, the 3D COA, wherein the 3D COA comprises a multimedia container comprising an experiential presentation with one or more digital media files associated with the physical object.

Clause 2. The method of clause 1, further comprising: displaying, by the server, on a display of a buyer computer device, the 3D COA as a rotatable three-dimensional virtual model having at least a first side and a second side, wherein the one or more digital media files associated with the physical object are displayed on the first side and the second side of the rotatable three-dimensional virtual model.

Clause 3. The method of clause 1 or 2, wherein the one or more digital media files comprises a photograph format file comprising an image of the physical object and a video format file comprising a creation of the physical object, wherein the photograph format file is displayed on the first side and the video format file is displayed on the second side.

Clause 4. The method of any one of clauses 1 to 3, wherein the one or more digital files is in a photograph format, a video format, or combinations thereof, wherein the information includes a description of the physical object, a provenance of the physical object, a manufacturing process for the physical object, or combinations thereof.

Clause 5. The method of any one of clauses 1 to 4, further comprising: storing, by the server in a data store, the one or more digital files.

Clause 6. The method of any one of clauses to 1 to 5, further comprising: generating, by the server, a tamperproof unique identifier for the physical object; and linking, by the server, the tamperproof unique identifier to the physical object.

Clause 7. The method of any one of clauses 1 to 6, further comprising: receiving, by the server, from a buyer computer device that scanned the tamperproof unique identifier, a demand to transfer ownership of the 3D COA; directing, by the server, the buyer computer device to a secure interface displaying the 3D COA; interacting, by the server, with the buyer computer device, to confirm the buyer computer device represents a bona fide buyer for the 3D COA and to create a buyer custodial wallet associated with the buyer computer device; generating, by the server, i) a non-fungible token (NFT) representing the 3D COA and ii) a cryptographic identifier for the NFT; adding, by the server, the NFT and a custodial wallet identifier of a buyer to a blockchain; and storing, by the server, the NFT and the 3D COA to a buyer custodial wallet.

Clause 8. The method of any one of clauses 1 to 7, further comprising: in response to receiving the demand, directing, by the server, the buyer computer device to a registration and login interface; redirecting, by the server, the buyer computer device to the secure interface; and creating, by the server, the buyer custodial wallet.

Clause 9. The method of any one of clauses 1 to 8, wherein the NFT comprises a hash of the 3D COA.

Clause 10. The method of any one of clauses 1 to 9, further comprising: prior to directing the buyer computer device to the secure interface, directing, by the server, the buyer computer device to an initial web page based on the tamperproof unique identifier.

Clause 11. The method of any one of clauses 1 to 10, wherein the tamperproof unique identifier encodes and obscures data associating the tamperproof unique identifier with the secure interface via a specific uniform resource locator (URL).

Clause 12. The method of any one of clauses 1 to 11, wherein the tamperproof unique identifier comprises a machine-readable indicium, a permanently attachable physical token, an integral indicium, a permanently attachable hologram, a near field communication (NFC) chip, a cryptographic seal, a microdot tag, a watermark, a magnetic stripe, a color-shifting ink, an invisible ink, a thermochromic ink, a chemical taggant, an acoustic taggant, an optical variable device, a micro-embossing, an anti-copying marker, a barcode, a QR code, or combinations thereof.

Clause 13. The method of any one of clauses 1 to 12, wherein the physical object comprises a manufactured consumer good, a consumable product, a hand-made object, a collectible object, a printed object, an art object, a digital storage medium, a historical object, an apparel object, a sports memorabilia object, a high-value luxury object, an object with a specific geographic source association, a forensic evidence object, an object bearing a serial number, an autographed object, a sealed object container, a book, a photograph, a record album, a videotape, a sculpture, a painting, a letter, a printed certificate, a jewelry object, a watch, a ball, a jersey, a helmet, a toy, a bottle, a firearm, a furniture object, a vehicle, an automotive component, a cosmetic object, a medical object, a pharmaceutical object, a semiconductor object, an aerospace component, or combinations thereof.

Clause 14. The method of any one of clauses 1 to 13, further comprising: securely, by the server, transferring ownership of the 3D COA from a first claimant to a second claimant by: confirming, by the server, that the 3D COA exists and has been claimed by the first claimant; and transferring, by the server, the 3D COA from the first claimant to the second claimant.

Clause 15. The method of any one of clauses 1 to 14, further comprising: enabling, by the server, at least one of a creator of the physical object and a vendor of the object to communicate directly with claimants.

Clause 16. The method of any one of clauses 1 to 15, further comprising: providing, by the server, claimants access to a rewards program, to encourage claimants to claim the 3D COA.

Clause 17. The method of any one of clauses 1 to 16, wherein the experiential presentation associates a user of the computer device with an event as an attendee; and wherein the 3D COA is a verification of attendance (VOA) for the user.

Clause 17A. The method of any one of clauses 1 to 17, wherein creating the 3D COA can include one or a combination of: defining one or more of a narrative, visual style, and interactive elements to be included in the 3D COA; constructing a three-dimensional (3D) environment in which the physical object can be placed; determining camera angles at which to place a camera relative to a COA product; determining an ambient light, a point light, a spot light, a directional light, or a combination for the COA product; creating a three-dimensional (3D) virtual model of the COA product; applying a texture to the 3D virtual model of the COA product; animating the 3D virtual model of the COA product; animating the camera to move around the 3D environment; adding or embedding a media file or a combination of medial files in the multimedia container that is 3D virtual model of the COA product; adding or embedding dynamic content such as a hologram, an augmented reality layer, an interactive hotspot, or combinations thereof into the multimedia container; embedding or adding an audio file to the multimedia container; rendering each frame of an animation of the 3D virtual model; combining the rendered frames into a video sequence; adding visual effects; formatting the video sequence of the 3D virtual model of the 3D COA 500 into a video file format; incorporating specific information onto the 3D COA or into a UI overlay of the 3D COA.

Clause 18. A server having one or more processors, memory, and instructions stored on the memory that cause the one or more processors to: receive a request to generate a three-dimensional digital certificate of authenticity (3D COA) for a physical object; receive from a computer device, one or more digital files containing information corresponding to the physical object; and create the 3D COA, wherein the 3D COA comprises a multimedia container comprising an experiential presentation with one or more digital media files associated with the physical object.

Clause 19. The server of clause 18, wherein the instructions further cause the one or more processors to: display on a display of a buyer computer device, the 3D COA as a rotatable three-dimensional virtual model having at least a first side and a second side, wherein the one or more digital media files associated with the physical object are displayed on the first side and the second side of the rotatable three-dimensional virtual model.

Clause 20. The server of clause 18 or 19, wherein the one or more digital media files comprises a photograph format file comprising an image of the physical object and a video format file comprising a creation of the physical object, wherein the photograph format file is displayed on the first side and the video format file is displayed on the second side.

Clause 21. The server of any one of clauses 18 to 20, wherein the one or more digital files is in a photograph format, a video format, or combinations thereof, wherein the information includes a description of the physical object, a provenance of the physical object, a manufacturing process for the physical object, or combinations thereof.

Clause 22. The server of any one of clauses 18 to 21, wherein the instructions further cause the one or more processors to: store in a data store the one or more digital files.

Clause 23. The server of any one of clauses 18 to 22, wherein the instructions further cause the one or more processors to: generate a tamperproof unique identifier for the physical object; and link the tamperproof unique identifier to the physical object.

Clause 24. The server of any one of clauses 18 to 23, wherein the instructions further cause the one or more processors to: receive from a buyer computer device that scanned the tamperproof unique identifier, a demand to transfer ownership of the 3D COA; direct the buyer computer device to a secure interface displaying the 3D COA; interact with the buyer computer device, to confirm the buyer computer device represents a bona fide buyer for the 3D COA and to create a buyer custodial wallet associated with the buyer computer device; generate i) a non-fungible token (NFT) representing the 3D COA and ii) a cryptographic identifier for the NFT; add the NFT and a custodial wallet identifier of a buyer to a blockchain; and store the NFT and the 3D COA to a buyer custodial wallet.

Clause 25. The server of any one of clauses 18 to 24, wherein the instructions further cause the one or more processors to: in response to receiving the demand, direct the buyer computer device to a registration and login interface; redirect the buyer computer device to the secure interface; and create the buyer custodial wallet.

Clause 26. The server of any one of clauses 18 to 25, wherein the NFT comprises a hash of the 3D COA.

Clause 27. The server of any one of clauses 18 to 26, further comprising: prior to directing the buyer computer device to the secure interface, direct the buyer computer device to an initial web page based on the tamperproof unique identifier.

Clause 28. The server of any one of clauses 18 to 27, wherein the tamperproof unique identifier encodes and obscures data associating the tamperproof unique identifier with the secure interface via a specific uniform resource locator (URL).

Clause 29. The server of any one of clauses 18 to 28, wherein the tamperproof unique identifier comprises a machine-readable indicium, a permanently attachable physical token, an integral indicium, a permanently attachable hologram, a near field communication (NFC) chip, a cryptographic seal, a microdot tag, a watermark, a magnetic stripe, a color-shifting ink, an invisible ink, a thermochromic ink, a chemical taggant, an acoustic taggant, an optical variable device, a micro-embossing, an anti-copying marker, a barcode, a QR code, or combinations thereof.

Clause 30. The server of any one of clauses 18 to 29, wherein the physical object comprises a manufactured consumer good, a consumable product, a hand-made object, a collectible object, a printed object, an art object, a digital storage medium, a historical object, an apparel object, a sports memorabilia object, a high-value luxury object, an object with a specific geographic source association, a forensic evidence object, an object bearing a serial number, an autographed object, a sealed object container, a book, a photograph, a record album, a videotape, a sculpture, a painting, a letter, a printed certificate, a jewelry object, a watch, a ball, a jersey, a helmet, a toy, a bottle, a firearm, a furniture object, a vehicle, an automotive component, a cosmetic object, a medical object, a pharmaceutical object, a semiconductor object, an aerospace component, or combinations thereof.

Clause 31. The server of any one of clauses 18 to 30, wherein the instructions further cause the one or more processors to: securely transfer ownership of the 3D COA from a first claimant to a second claimant by: confirm that the 3D COA exists and has been claimed by the first claimant; and transfer the 3D COA from the first claimant to the second claimant.

Clause 32. The server of any one of clauses 18 to 31, wherein the instructions further cause the one or more processors to: enable at least one of a creator of the physical object and a vendor of the object to communicate directly with claimants.

Clause 33. The server of any one of clauses 18 to 32, wherein the instructions further cause the one or more processors to: provide claimants access to a rewards program, to encourage claimants to claim the 3D COA.

Clause 34. The server of any one of clauses 18 to 33, wherein the experiential presentation associates a user of the computer device with an event as an attendee; and wherein the 3D COA is a verification of attendance (VOA) for the user.

Clause 34A. The server of any one of clauses 18 to 34, wherein creating the 3D COA can include one or a combination of: defining one or more of a narrative, visual style, and interactive elements to be included in the 3D COA; constructing a three-dimensional (3D) environment in which the physical object can be placed; determining camera angles at which to place a camera relative to a COA product; determining an ambient light, a point light, a spot light, a directional light, or a combination for the COA product; creating a three-dimensional (3D) virtual model of the COA product; applying a texture to the 3D virtual model of the COA product; animating the 3D virtual model of the COA product; animating the camera to move around the 3D environment; adding or embedding a media file or a combination of medial files in the multimedia container that is 3D virtual model of the COA product; adding or embedding dynamic content such as a hologram, an augmented reality layer, an interactive hotspot, or combinations thereof into the multimedia container; embedding or adding an audio file to the multimedia container; rendering each frame of an animation of the 3D virtual model; combining the rendered frames into a video sequence; adding visual effects; formatting the video sequence of the 3D virtual model of the 3D COA 500 into a video file format; incorporating specific information onto the 3D COA or into a UI overlay of the 3D COA.

Clause 35. A computer program product comprising a non-transitory computer-readable medium with computer executable instructions tangibly embodied thereon that, when executed by a processor: receives a request to generate a three-dimensional digital certificate of authenticity (3D COA) for a physical object; receives one or more digital files containing information corresponding to the physical object; and creates the 3D COA, wherein the 3D COA comprises a multimedia container comprising an experiential presentation with one or more digital media files associated with the physical object.

Clause 36. The computer program product of clause 35, wherein when executed by the processor, the instructions: display on a display of a buyer computer device, the 3D COA as a rotatable three-dimensional virtual model having at least a first side and a second side, wherein the one or more digital media files associated with the physical object are displayed on the first side and the second side of the rotatable three-dimensional virtual model.

Clause 37. The computer program product of clause 35 or 36, wherein the one or more digital media files comprises a photograph format file comprising an image of the physical object and a video format file comprising a creation of the physical object, wherein the photograph format file is displayed on the first side and the video format file is displayed on the second side.

Clause 38. The computer program product of any one of clauses 35 to 37, wherein the one or more digital files is in a photograph format, a video format, or combinations thereof, wherein the information includes a description of the physical object, a provenance of the physical object, a manufacturing process for the physical object, or combinations thereof.

Clause 39. The computer program product of any one of clauses 35 to 38, wherein when executed by the processor, the instructions: store in a data store, the one or more digital files.

Clause 40. The computer program product of any one of clauses 35 to 39, wherein when executed by the processor, the instructions: generate a tamperproof unique identifier for the physical object; and link the tamperproof unique identifier to the physical object.

Clause 41. The computer program product of any one of clauses 35 to 40, wherein when executed by the processor, the instructions: receive from a buyer computer device that scanned the tamperproof unique identifier, a demand to transfer ownership of the 3D COA; direct the buyer computer device to a secure interface displaying the 3D COA; interact with the buyer computer device, to confirm the buyer computer device represents a bona fide buyer for the 3D COA and to create a buyer custodial wallet associated with the buyer computer device; generate i) a non-fungible token (NFT) representing the 3D COA and ii) a cryptographic identifier for the NFT; add the NFT and a custodial wallet identifier of a buyer to a blockchain; and store the NFT and the 3D COA to a buyer custodial wallet.

Clause 42. The computer program product of any one of clauses 35 to 41, wherein when executed by the processor, the instructions: in response to receiving the demand, direct the buyer computer device to a registration and login interface; redirect the buyer computer device to the secure interface; and create the buyer custodial wallet.

Clause 43. The computer program product of any one of clauses 35 to 42, wherein the NFT comprises a hash of the 3D COA.

Clause 44. The computer program product of any one of clauses 35 to 43, wherein when executed by the processor, the instructions: prior to directing the buyer computer device to the secure interface, direct the buyer computer device to an initial web page based on the tamperproof unique identifier.

Clause 45. The computer program product of any one of clauses 35 to 44, wherein the tamperproof unique identifier encodes and obscures data associating the tamperproof unique identifier with the secure interface via a specific uniform resource locator (URL).

Clause 46. The computer program product of any one of clauses 35 to 45, wherein the tamperproof unique identifier comprises a machine-readable indicium, a permanently attachable physical token, an integral indicium, a permanently attachable hologram, a near field communication (NFC) chip, a cryptographic seal, a microdot tag, a watermark, a magnetic stripe, a color-shifting ink, an invisible ink, a thermochromic ink, a chemical taggant, an acoustic taggant, an optical variable device, a micro-embossing, an anti-copying marker, a barcode, a QR code, or combinations thereof.

Clause 47. The computer program product of any one of clauses 35 to 46, wherein the physical object comprises a manufactured consumer good, a consumable product, a hand-made object, a collectible object, a printed object, an art object, a digital storage medium, a historical object, an apparel object, a sports memorabilia object, a high-value luxury object, an object with a specific geographic source association, a forensic evidence object, an object bearing a serial number, an autographed object, a sealed object container, a book, a photograph, a record album, a videotape, a sculpture, a painting, a letter, a printed certificate, a jewelry object, a watch, a ball, a jersey, a helmet, a toy, a bottle, a firearm, a furniture object, a vehicle, an automotive component, a cosmetic object, a medical object, a pharmaceutical object, a semiconductor object, an aerospace component, or combinations thereof.

Clause 48. The computer program product of any one of clauses 35 to 47, wherein when executed by the processor, the instructions: securely transfer ownership of the 3D COA from a first claimant to a second claimant by: confirming that the 3D COA exists and has been claimed by the first claimant; and transfer the 3D COA from the first claimant to the second claimant.

Clause 49. The computer program product of any one of clauses 35 to 48, wherein when executed by the processor, the instructions: enable at least one of a creator of the physical object and a vendor of the object to communicate directly with claimants.

Clause 50. The computer program product of any one of clauses 35 to 49, wherein when executed by the processor, the instructions: provide claimants access to a rewards program, to encourage claimants to claim the 3D COA.

Clause 51. The computer program product of any one of clauses 35 to 50, wherein the experiential presentation associates a user with an event as an attendee; and wherein the 3D COA is a verification of attendance (VOA) for the user.

Clause 51A. The computer program product of any one of clauses 35 to 51, wherein creating the 3D COA can include one or a combination of: defining one or more of a narrative, visual style, and interactive elements to be included in the 3D COA; constructing a three-dimensional (3D) environment in which the physical object can be placed; determining camera angles at which to place a camera relative to a COA product; determining an ambient light, a point light, a spot light, a directional light, or a combination for the COA product; creating a three-dimensional (3D) virtual model of the COA product; applying a texture to the 3D virtual model of the COA product; animating the 3D virtual model of the COA product; animating the camera to move around the 3D environment; adding or embedding a media file or a combination of medial files in the multimedia container that is 3D virtual model of the COA product; adding or embedding dynamic content such as a hologram, an augmented reality layer, an interactive hotspot, or combinations thereof into the multimedia container; embedding or adding an audio file to the multimedia container; rendering each frame of an animation of the 3D virtual model; combining the rendered frames into a video sequence; adding visual effects; formatting the video sequence of the 3D virtual model of the 3D COA 500 into a video file format; incorporating specific information onto the 3D COA or into a UI overlay of the 3D COA.

As used herein, the term component might describe a given unit of functionality that may be performed in accordance with one or more aspects of the technology disclosed herein. As used herein, a component might be implemented utilizing any form of hardware, software, or a combination thereof. For example, one or more processors, controllers, ASICs, programmable logic arrays (PLAs), programmable array logics (PALs), complex programmable logic devices (CPLDs), FPGAs, logical components, software routines or other mechanisms might be implemented to make up a component. Hardware logic, including programmable logic for use with a programmable logic device (PLD) implementing all or part of the functionality previously described herein, may be designed using traditional manual methods or may be designed, captured, simulated, or documented electronically using various tools, such as Computer Aided Design (CAD) programs, a hardware description language (e.g., VHDL or AHDL), or a PLD programming language. Hardware logic may also be generated by a non-transitory computer-readable medium storing instructions that, when executed by a processor, manage parameters of a semiconductor component, a cell, a library of components, or a library of cells in electronic design automation (EDA) software to generate a manufacturable design for an integrated circuit. In implementation, the various components described herein might be implemented as discrete components or the functions and features described may be shared in part or in total among one or more components. In other words, as would be apparent to one of ordinary skill in the art after reading this description, the various features and functionality described herein may be implemented in any given application and may be implemented in one or more separate or shared components in various combinations and permutations. Even though various features or elements of functionality may be individually described or claimed as separate components, one of ordinary skill in the art will understand that these features and functionality may be shared among one or more common software and hardware elements, and such description shall not require or imply that separate hardware or software components are used to implement such features or functionality.

Although the present disclosure and its advantages have been described in detail, it should be understood that various changes, substitutions, and alterations may be made herein without departing from the scope of the disclosure as defined by the appended claims. Moreover, the scope of the present application is not intended to be limited to the particular aspects of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or steps.

While various aspects of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, with the aid of this disclosure it will be apparent to one of skill in the art how alternative functional, logical, or physical partitioning and configurations may be implemented to implement the desired features of the technology disclosed herein. Also, a multitude of different constituent component names other than those depicted herein may be applied to the various partitions. Additionally, with regard to flow diagrams, operational descriptions and method claims, the order in which the steps are presented herein shall not mandate that various aspects be implemented to perform the recited functionality in the same order unless the context dictates otherwise.

Although the disclosed technology is described above in terms of various exemplary aspects and implementations, it should be understood that the various features, aspects, and functionality described in one or more of the individual aspects are not limited in their applicability to the particular aspect with which they are described, but instead may be applied, alone or in various combinations, to one or more of the other aspects of the disclosed technology, whether or not such aspects are described and whether or not such features are presented as being a part of a described aspect. Thus, the breadth and scope of the technology disclosed herein should not be limited by any of the above-described exemplary aspects.

Additionally, the various aspects set forth herein are described in terms of exemplary block diagrams, flow charts and other illustrations. As will become apparent to one of ordinary skill in the art after reading this document, the illustrated aspects and their various alternatives may be implemented without confinement to the illustrated examples. For example, block diagrams and their accompanying description should not be construed as mandating a particular architecture or configuration.

What is claimed is:

1. A method comprising:
receiving, by a server, a request to generate a three-dimensional digital certificate of authenticity (3D COA) for a physical object;
receiving, by the server from a computer device, one or more digital files containing information corresponding to the physical object;
creating, by the server, the 3D COA, wherein the 3D COA comprises a multimedia container comprising an experiential presentation with one or more digital media files associated with the physical object;
displaying, by the server, on a display of a buyer computer device, the 3D COA as a three-dimensional virtual model, wherein the one or more digital media files comprise a photograph format file, a video format file, or both;
generating, by the server, a tamperproof unique identifier for the physical object;
linking, by the server, the tamperproof unique identifier to the physical object;
receiving, by the server, from the buyer computer device that scanned the tamperproof unique identifier, a demand to transfer ownership of the 3D COA;
in response to receiving the demand, directing, by the server, the buyer computer device to a registration and login interface;
redirecting, by the server, the buyer computer device to a secure interface displaying the 3D COA;
interacting, by the server with the buyer computer device, to confirm the buyer computer device represents a bona fide buyer for the 3D COA;
creating, by the server, a buyer custodial wallet associated with the buyer computer device;
generating, by the server, i) a non-fungible token (NFT) representing the 3D COA and ii) a custodial wallet identifier for the buyer custodial wallet;

adding, by the server, the NFT and the custodial wallet identifier to a blockchain; and storing, by the server, the NFT and the 3D COA to the buyer custodial wallet.

2. The method of claim 1, wherein the three-dimensional virtual model is interactive.

3. The method of claim 1, wherein the photograph format file comprises an image of the physical object and the video format file comprises a creation of the physical object.

4. The method of claim 1, wherein the one or more digital files is in a photograph format, a video format, or combinations thereof, wherein the information includes a description of the physical object, a provenance of the physical object, a manufacturing process for the physical object, or combinations thereof.

5. The method of claim 1, further comprising:
storing, by the server in a data store, the one or more digital files.

6. The method of claim 1, wherein the NFT comprises a hash of the 3D COA.

7. The method of claim 1, further comprising: prior to directing the buyer computer device to the secure interface, directing, by the server, the buyer computer device to an initial web page based on the tamperproof unique identifier.

8. The method of claim 1, wherein the tamperproof unique identifier encodes and obscures data associating the tamperproof unique identifier with the secure interface via a specific uniform resource locator (URL).

9. The method of claim 1, wherein the tamperproof unique identifier comprises a machine-readable indicium, a permanently attachable physical token, an integral indicium, a permanently attachable hologram, a near field communication (NFC) chip, a cryptographic seal, a microdot tag, a watermark, a magnetic stripe, a color-shifting ink, an invisible ink, a thermochromic ink, a chemical taggant, an acoustic taggant, an optical variable device, a micro-embossing, an anti-copying marker, a barcode, a QR code, or combinations thereof.

10. The method of claim 1, wherein the physical object comprises a manufactured consumer good, a consumable product, a hand-made object, a collectible object, a printed object, an art object, a digital storage medium, a historical object, an apparel object, a sports memorabilia object, a high-value luxury object, an object with a specific geographic source association, a forensic evidence object, an object bearing a serial number, an autographed object, a sealed object container, a book, a photograph, a record album, a videotape, a sculpture, a painting, a letter, a printed certificate, a jewelry object, a watch, a ball, a jersey, a helmet, a toy, a bottle, a firearm, a furniture object, a vehicle, an automotive component, a cosmetic object, a medical object, a pharmaceutical object, a semiconductor object, an aerospace component, or combinations thereof.

11. The method of claim 1, further comprising:
securely, by the server, transferring ownership of the 3D COA from a first claimant to a second claimant by:
confirming, by the server, that the 3D COA exists and has been claimed by the first claimant; and
transferring, by the server, the 3D COA from the first claimant to the second claimant.

12. The method of claim 1, further comprising: enabling, by the server, at least one of a creator of the physical object and a vendor of the object to communicate directly with claimants.

13. The method of claim 1, further comprising:
providing, by the server, claimants access to a rewards program, to encourage claimants to claim the 3D COA.

14. The method of claim 1,
wherein the experiential presentation associates a user of the computer device with an event as an attendee; and
wherein the 3D COA is a verification of attendance (VOA) for the user.

15. The method of claim 1, wherein creating the 3D COA can include one or a combination of: defining one or more of a narrative, visual style, and interactive elements to be included in the 3D COA; constructing a three-dimensional (3D) environment in which the physical object can be placed; determining camera angles at which to place a camera relative to a COA product; determining an ambient light, a point light, a spot light, a directional light, or a combination for the COA product; creating the three-dimensional virtual model to be of the COA product; applying a texture to the three-dimensional virtual model of the COA product; animating the three-dimensional virtual model of the COA product; animating the camera to move around the 3D environment; adding or embedding a media file or a combination of medial files in the multimedia container that is three-dimensional virtual model of the COA product; adding or embedding dynamic content such as a hologram, an augmented reality layer, an interactive hotspot, or combinations thereof into the multimedia container; embedding or adding an audio file to the multimedia container; rendering each frame of an animation of the three-dimensional virtual model; combining the rendered frames into a video sequence; adding visual effects; formatting the video sequence of the three-dimensional virtual model of the 3D COA 500 into a video file format; incorporating specific information onto the 3D COA or into a user interface (UI) overlay of the 3D COA.

16. A server having one or more processors, memory, and instructions stored on the memory that cause the one or more processors to:
receive a request to generate a three-dimensional digital certificate of authenticity (3D COA) for a physical object;
receive from a computer device, one or more digital files containing information corresponding to the physical object;
create the 3D COA, wherein the 3D COA comprises a multimedia container comprising an experiential presentation with one or more digital media files associated with the physical object;
display, on a display of a buyer computer device, the 3D COA as a three-dimensional virtual model, wherein the one or more digital media files comprise a photograph format file, a video format file, or both;
generate a tamperproof unique identifier for the physical object;
link the tamperproof unique identifier to the physical object;
receive, from the buyer computer device that scanned the tamperproof unique identifier, a demand to transfer ownership of the 3D COA;
in response to receiving the demand, direct the buyer computer device to a registration and login interface;
redirect the buyer computer device to a secure interface displaying the 3D COA;
interact with the buyer computer device to confirm the buyer computer device represents a bona fide buyer for the 3D COA;
create a buyer custodial wallet associated with the buyer computer device;

generate i) a non-fungible token (NFT) representing the 3D COA and ii) a custodial wallet identifier for the buyer custodial wallet;

add the NFT and the custodial wallet identifier to a blockchain; and store the NFT and the 3D COA to the buyer custodial wallet.

17. A computer program product comprising a non-transitory computer-readable medium with computer executable instructions tangibly embodied thereon that, when executed by a processor:

receives a request to generate a three-dimensional digital certificate of authenticity (3D COA) for a physical object;

receives one or more digital files containing information corresponding to the physical object;

creates the 3D COA, wherein the 3D COA comprises a multimedia container comprising an experiential presentation with one or more digital media files associated with the physical object;

displays, on a display of a buyer computer device, the 3D COA as a three-dimensional virtual model, wherein the one or more digital media files comprise a photograph format file, a video format file, or both;

generates a tamperproof unique identifier for the physical object;

links the tamperproof unique identifier to the physical object;

receives, from the buyer computer device that scanned the tamperproof unique identifier, a demand to transfer ownership of the 3D COA;

in response to receiving the demand, directs the buyer computer device to a registration and login interface;

redirects the buyer computer device to a secure interface displaying the 3D COA;

interacts with the buyer computer device to confirm the buyer computer device represents a bona fide buyer for the 3D COA;

creates a buyer custodial wallet associated with the buyer computer device;

generates i) a non-fungible token (NFT) representing the 3D COA and ii) a custodial wallet identifier for the buyer custodial wallet;

adds the NFT and the custodial wallet identifier to a blockchain; and stores the NFT and the 3D COA to the buyer custodial wallet.

* * * * *